United States Patent
Rander et al.

(10) Patent No.: US 10,712,160 B2
(45) Date of Patent: Jul. 14, 2020

(54) VEHICLE TRACTION MAP FOR AUTONOMOUS VEHICLES

(71) Applicant: UATC, LLC, San Francisco, CA (US)

(72) Inventors: Peter Rander, Pittsburgh, PA (US); David McAllister Bradley, Pittsburgh, PA (US); Matthew Wood, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 340 days.

(21) Appl. No.: 15/376,574

(22) Filed: Dec. 12, 2016

(65) Prior Publication Data

US 2017/0167881 A1 Jun. 15, 2017

Related U.S. Application Data

(63) Continuation-in-part of application No. 15/376,270, filed on Dec. 12, 2016.

(60) Provisional application No. 62/265,960, filed on Dec. 10, 2015.

(51) Int. Cl.
| | |
|---|---|
| *G01C 21/32* | (2006.01) |
| *B60W 30/18* | (2012.01) |
| *B60W 40/068* | (2012.01) |
| *G05D 1/00* | (2006.01) |
| *G01N 21/47* | (2006.01) |

(52) U.S. Cl.
CPC ....... *G01C 21/32* (2013.01); *B60W 30/18172* (2013.01); *B60W 40/068* (2013.01); *G01N 21/4738* (2013.01); *G05D 1/0088* (2013.01)

(58) Field of Classification Search
CPC .. G01C 21/32; G01N 21/4738; G05D 1/0088; B60W 30/18172; B60W 40/068
See application file for complete search history.

(56) References Cited

U.S. PATENT DOCUMENTS

| | | | |
|---|---|---|---|
| 5,144,685 | A | 9/1992 | Nasar |
| 5,751,852 | A | 5/1998 | Marimont |
| 5,809,179 | A | 9/1998 | Marimont |
| 5,864,214 | A | 1/1999 | Brodsky |
| 6,023,655 | A | 2/2000 | Nomura |
| 6,385,539 | B1 | 5/2002 | Wilson |
| 6,542,111 | B1 | 4/2003 | Wilson |
| 6,795,031 | B1 | 9/2004 | Walker |
| 7,102,496 | B1 | 9/2006 | Ernst, Jr. |
| 7,124,027 | B1 | 10/2006 | Ernst, Jr. |
| 7,783,403 | B2 | 8/2010 | Breed |
| 7,994,465 | B1 | 8/2011 | Bamji |

(Continued)

FOREIGN PATENT DOCUMENTS

| | | |
|---|---|---|
| CN | 102390370 | 3/2012 |
| CN | 202394343 | 8/2012 |

(Continued)

OTHER PUBLICATIONS

Office Action issued in CN 201710311393.1 dated Nov. 12, 2018.

(Continued)

*Primary Examiner* — Anne Marie Antonucci
(74) *Attorney, Agent, or Firm* — Dority & Manning, P.A.

(57) ABSTRACT

A vehicle determines a traction value for a surface of a road segment, and associates the traction value with a location of the surface. The vehicle stores the traction value and location as part of a traction map.

19 Claims, 14 Drawing Sheets

(56) References Cited

U.S. PATENT DOCUMENTS

| | | |
|---|---|---|
| 8,145,402 B2 | 3/2012 | Craig |
| 8,245,516 B2 | 8/2012 | Song |
| 8,253,799 B2 | 8/2012 | Elangovan |
| 8,364,334 B2 | 1/2013 | Au |
| 8,412,449 B2 | 4/2013 | Trepagnier |
| 8,521,352 B1 | 8/2013 | Ferguson |
| 8,559,673 B2 | 10/2013 | Fairfield |
| 8,676,430 B1 | 3/2014 | Ferguson |
| 8,825,265 B1 | 9/2014 | Ferguson |
| 8,917,190 B1 | 12/2014 | Melvin |
| 9,036,865 B2 | 5/2015 | Haas |
| 9,045,041 B2 | 6/2015 | Dorum |
| 9,097,800 B1 | 8/2015 | Zhu |
| 9,139,204 B1 | 9/2015 | Zhao |
| 9,140,792 B2 | 9/2015 | Zeng |
| 9,145,140 B2 | 9/2015 | Ferguson |
| 9,158,980 B1 | 10/2015 | Ferguson |
| 9,223,013 B2 | 12/2015 | Stein |
| 9,330,321 B2 | 5/2016 | Schamp |
| 9,383,753 B1 | 7/2016 | Templeton |
| 9,386,230 B1 | 7/2016 | Duran |
| 9,442,487 B1 | 9/2016 | Ferguson |
| 9,459,625 B1 | 10/2016 | Ferguson |
| 9,488,483 B2 | 11/2016 | Ranganathan |
| 9,494,439 B1 | 11/2016 | Ross |
| 9,507,346 B1 | 11/2016 | Levinson |
| 9,552,564 B1 | 1/2017 | Martenis |
| 9,631,933 B1 | 4/2017 | Aula |
| 9,672,446 B1 | 6/2017 | Vallespi-Gonzalez |
| 9,672,734 B1 | 6/2017 | Ratnasingam |
| 9,683,928 B2 | 6/2017 | Swanson |
| 9,701,239 B2 | 7/2017 | Kentley |
| 9,719,801 B1 | 8/2017 | Ferguson et al. |
| 9,739,881 B1 | 8/2017 | Pavek |
| 9,840,256 B1 | 12/2017 | Valois |
| 9,841,763 B1 | 12/2017 | Valois |
| 9,863,928 B1 | 1/2018 | Peterson |
| 9,902,403 B2 | 2/2018 | Donnelly |
| 9,904,375 B1 | 2/2018 | Donnelly |
| 9,914,458 B2 | 3/2018 | Sato |
| 9,916,703 B2 | 3/2018 | Levinson |
| 9,953,535 B1 | 4/2018 | Canavor |
| 10,002,156 B2 | 6/2018 | Lublinsky |
| 10,036,639 B1 | 7/2018 | Cox |
| 10,094,672 B2 | 10/2018 | Utsugi |
| 2002/0109610 A1 | 8/2002 | Katz |
| 2002/0161501 A1 | 10/2002 | Dulin |
| 2003/0001509 A1 | 1/2003 | Leleve |
| 2003/0040944 A1 | 2/2003 | Hileman |
| 2003/0151547 A1 | 8/2003 | Mauro |
| 2004/0085227 A1 | 5/2004 | Mikuriya |
| 2004/0133330 A1 | 7/2004 | Ono |
| 2004/0204812 A1 | 10/2004 | Tran |
| 2005/0010350 A1 | 1/2005 | Hiwatashi |
| 2005/0044944 A1 | 3/2005 | Kogure |
| 2005/0100207 A1 | 5/2005 | Konolige |
| 2005/0113999 A1 | 5/2005 | Tange |
| 2005/0155685 A1 | 7/2005 | Daval |
| 2005/0222744 A1 | 10/2005 | Sakata |
| 2006/0002586 A1 | 1/2006 | Aggarwal |
| 2006/0126975 A1 | 6/2006 | McKellar |
| 2006/0128087 A1 | 6/2006 | Bamji |
| 2006/0208911 A1 | 9/2006 | Davis |
| 2006/0217882 A1 | 9/2006 | Takashima |
| 2006/0223637 A1 | 10/2006 | Rosenberg |
| 2006/0259225 A1 | 11/2006 | Ono |
| 2007/0050121 A1 | 3/2007 | Ammon |
| 2007/0229490 A1 | 10/2007 | Boudreau |
| 2007/0268364 A1 | 11/2007 | Neff |
| 2008/0033645 A1 | 2/2008 | Levinson |
| 2008/0040004 A1 | 2/2008 | Breed |
| 2008/0129475 A1 | 6/2008 | Breed |
| 2008/0162036 A1 | 7/2008 | Breed |
| 2009/0010495 A1 | 1/2009 | Schamp |
| 2009/0043439 A1 | 2/2009 | Barfoot |
| 2009/0043440 A1 | 2/2009 | Matsukawa |
| 2009/0070034 A1 | 3/2009 | Oesterling |
| 2009/0146813 A1 | 6/2009 | Gustavo |
| 2009/0150036 A1 | 6/2009 | Craig |
| 2009/0005961 A1 | 8/2009 | Grabowski |
| 2009/0216600 A1 | 8/2009 | Hill |
| 2009/0228204 A1 | 9/2009 | Zavoli |
| 2009/0306859 A1 | 12/2009 | Tichy |
| 2009/0319129 A1 | 12/2009 | Ghoneim |
| 2009/0322872 A1 | 12/2009 | Muehlmann |
| 2009/0326991 A1 | 12/2009 | Wei |
| 2010/0013615 A1 | 1/2010 | Hebert |
| 2010/0020170 A1 | 1/2010 | Higgins-Luthman |
| 2010/0023213 A1 | 1/2010 | Mizuno |
| 2010/0023214 A1 | 1/2010 | Horiguchi |
| 2010/0030460 A1 | 2/2010 | Sawai |
| 2010/0165323 A1 | 7/2010 | Fiess |
| 2010/0217491 A1 | 8/2010 | Naito |
| 2010/0235083 A1 | 9/2010 | Takahata |
| 2010/0245123 A1 | 9/2010 | Prasad |
| 2010/0250052 A1 | 9/2010 | Ogino |
| 2010/0250056 A1 | 9/2010 | Perkins |
| 2010/0256836 A1 | 10/2010 | Mudalige |
| 2010/0262359 A1 | 10/2010 | Motoyama |
| 2010/0274469 A1 | 10/2010 | Takahata |
| 2010/0280751 A1 | 11/2010 | Breed |
| 2010/0295946 A1 | 11/2010 | Reed |
| 2010/0299063 A1 | 11/2010 | Nakamura |
| 2011/0012511 A1 | 1/2011 | Watanabe |
| 2011/0043377 A1 | 2/2011 | McGrath |
| 2011/0046784 A1 | 2/2011 | Anderson |
| 2011/0054791 A1 | 3/2011 | Surampudi |
| 2011/0060478 A1 | 3/2011 | Nickolaou |
| 2011/0285982 A1 | 11/2011 | Breed |
| 2012/0006610 A1 | 1/2012 | Wallace |
| 2012/0045090 A1 | 2/2012 | Bobbitt |
| 2012/0083959 A1 | 4/2012 | Dolgov |
| 2012/0121161 A1 | 5/2012 | Eade |
| 2012/0158313 A1 | 6/2012 | Wang |
| 2012/0242492 A1 | 9/2012 | Grunfeld |
| 2012/0283912 A1 | 11/2012 | Lee |
| 2012/0296539 A1 | 11/2012 | Cooprider |
| 2012/0310516 A1 | 12/2012 | Zeng |
| 2012/0327410 A1 | 12/2012 | Maston |
| 2013/0015984 A1 | 1/2013 | Yamashiro |
| 2013/0018575 A1 | 1/2013 | Birken |
| 2013/0060461 A1 | 3/2013 | Wong |
| 2013/0083159 A1 | 4/2013 | Ooshima |
| 2013/0117321 A1 | 5/2013 | Fischer |
| 2013/0215115 A1 | 8/2013 | Jenkins |
| 2013/0314503 A1 | 11/2013 | Nix |
| 2013/0325279 A1 | 12/2013 | Fujimoto |
| 2014/0002277 A1 | 1/2014 | Fulger |
| 2014/0005933 A1 | 1/2014 | Fong |
| 2014/0025232 A1 | 1/2014 | Cuddihy |
| 2014/0046585 A1 | 2/2014 | Morris |
| 2014/0047250 A1 | 2/2014 | Maletsky |
| 2014/0081573 A1 | 3/2014 | Urmson |
| 2014/0118363 A1 | 5/2014 | Hakura |
| 2014/0133330 A1 | 5/2014 | Chapman |
| 2014/0136414 A1 | 5/2014 | Abhyanker |
| 2014/0188363 A1 | 7/2014 | Eckert |
| 2014/0188386 A1 | 7/2014 | Obara |
| 2014/0222298 A1 | 8/2014 | Gurin |
| 2016/0055744 A1 | 8/2014 | Branson |
| 2014/0247357 A1 | 9/2014 | Sekiguchi |
| 2014/0302774 A1 | 10/2014 | Burke |
| 2014/0306835 A1 | 10/2014 | Ricci |
| 2014/0307247 A1 | 10/2014 | Zhu |
| 2015/0142248 A1 | 10/2014 | Han |
| 2014/0336842 A1 | 11/2014 | Jang |
| 2014/0336935 A1 | 11/2014 | Zhu |
| 2014/0340304 A1 | 11/2014 | Dewan |
| 2015/0003670 A1 | 1/2015 | Kuehnle |
| 2015/0035985 A1 | 2/2015 | Conneely |
| 2015/0061856 A1 | 3/2015 | Raman |
| 2015/0112585 A1 | 4/2015 | Knepper |
| 2015/0124428 A1 | 5/2015 | Hadrath |
| 2015/0166072 A1 | 6/2015 | Powers |

(56) References Cited

U.S. PATENT DOCUMENTS

| | | |
|---|---|---|
| 2015/0202770 A1 | 7/2015 | Patron |
| 2015/0203107 A1 | 7/2015 | Lippman |
| 2015/0210274 A1 | 7/2015 | Clark |
| 2015/0210277 A1 | 7/2015 | Ben Shalom |
| 2015/0224845 A1 | 8/2015 | Anderson |
| 2015/0247733 A1 | 9/2015 | Horihata |
| 2015/0251659 A1 | 9/2015 | Fischer |
| 2015/0266471 A1 | 9/2015 | Ferguson |
| 2015/0310146 A1 | 10/2015 | Tanzmeister |
| 2015/0331422 A1 | 11/2015 | Hartung |
| 2015/0344038 A1 | 12/2015 | Stenneth |
| 2015/0346727 A1 | 12/2015 | Ramanujam |
| 2015/0362322 A1 | 12/2015 | Ozaki |
| 2015/0369617 A1 | 12/2015 | Ding |
| 2016/0009218 A1 | 1/2016 | Nakashima |
| 2016/0016663 A1 | 1/2016 | Stanek |
| 2016/0054135 A1 | 2/2016 | Fowe |
| 2016/0125608 A1 | 5/2016 | Sorstedt |
| 2016/0133131 A1 | 5/2016 | Grimm |
| 2016/0167582 A1 | 6/2016 | Chen |
| 2016/0176408 A1 | 6/2016 | Lynch |
| 2016/0178802 A1 | 6/2016 | Stainvas Olshansky |
| 2016/0180171 A1 | 6/2016 | Kamata |
| 2016/0207537 A1 | 7/2016 | Urano |
| 2018/0003511 A1 | 7/2016 | Browning |
| 2018/0004225 A1 | 7/2016 | Milstein |
| 2016/0267720 A1 | 9/2016 | Mandella |
| 2016/0276131 A1 | 9/2016 | Platzgummer |
| 2016/0349063 A1 | 12/2016 | Maurer |
| 2016/0357188 A1 | 12/2016 | Ansari |
| 2016/0368504 A1 | 12/2016 | Kieren |
| 2016/0370191 A1 | 12/2016 | Utsugi |
| 2017/0008521 A1 | 1/2017 | Braunstein |
| 2017/0008522 A1 | 1/2017 | Sato |
| 2017/0015317 A1 | 1/2017 | Fasola |
| 2017/0015318 A1 | 1/2017 | Scofield |
| 2017/0016731 A1 | 1/2017 | Koshiba |
| 2017/0023659 A1 | 1/2017 | Bruemmer |
| 2017/0059336 A1 | 3/2017 | Huang |
| 2017/0090478 A1 | 3/2017 | Blayvas |
| 2017/0120814 A1 | 5/2017 | Duran |
| 2017/0123421 A1 | 5/2017 | Kentley |
| 2017/0123429 A1 | 5/2017 | Levinson |
| 2017/0124781 A1 | 5/2017 | Douillard |
| 2017/0126975 A1 | 5/2017 | Duran |
| 2017/0146991 A1 | 5/2017 | Parekh |
| 2017/0168489 A1 | 6/2017 | Rander |
| 2017/0172290 A1 | 6/2017 | Sampaio |
| 2017/0174194 A1 | 6/2017 | Baumgaertner |
| 2017/0193826 A1 | 7/2017 | Marueli |
| 2017/0227647 A1 | 8/2017 | Baik |
| 2017/0229029 A1 | 8/2017 | Klinger |
| 2017/0243073 A1 | 8/2017 | Raghu et al. |
| 2017/0248963 A1 | 8/2017 | Levinson |
| 2017/0255966 A1 | 9/2017 | Khoury |
| 2017/0262709 A1 | 9/2017 | Wellington |
| 2017/0270361 A1 | 9/2017 | Puttagunta |
| 2017/0307763 A1 | 10/2017 | Browning |
| 2017/0309172 A1 | 10/2017 | Linder |
| 2017/0313324 A1 | 11/2017 | Kumai |
| 2017/0315229 A1 | 11/2017 | Pavek |
| 2017/0316333 A1 | 11/2017 | Levinson |
| 2017/0316696 A1 | 11/2017 | Bartel |
| 2017/0345400 A1 | 11/2017 | Li |
| 2017/0351261 A1 | 12/2017 | Levinson |
| 2017/0351984 A1 | 12/2017 | Rasheed |
| 2017/0357669 A1* | 12/2017 | Offenhaeuser ...... B60W 40/068 |
| 2017/0358204 A1 | 12/2017 | Modica |
| 2018/0004226 A1 | 1/2018 | Milstein |
| 2018/0045519 A1 | 2/2018 | Ghadiok |
| 2018/0060778 A1 | 3/2018 | Guo |
| 2018/0061242 A1 | 3/2018 | Bavar |
| 2018/0143639 A1 | 5/2018 | Singhal |
| 2018/0164119 A1 | 6/2018 | Becker |
| 2018/0189578 A1 | 7/2018 | Yang |
| 2018/0304891 A1 | 10/2018 | Heidenreich |

FOREIGN PATENT DOCUMENTS

| | | |
|---|---|---|
| CN | 202394343 U | 8/2012 |
| CN | 103370249 | 10/2013 |
| CN | 104601648 | 5/2015 |
| CN | 104601648 A | 5/2015 |
| DE | 102014114438 | 4/2015 |
| EP | 3032458 | 6/2016 |
| EP | 3032458 | 10/2018 |
| JP | H08334365 | 12/1996 |
| JP | H 08334365 | 3/2005 |
| JP | 2005-115911 | 4/2005 |
| JP | 2006-159939 | 6/2006 |
| JP | 2008-027239 | 2/2008 |
| JP | 2008-262459 | 10/2008 |
| JP | 2009-075756 | 4/2009 |
| JP | 2012-127861 | 7/2012 |
| JP | 2015-007874 | 1/2015 |
| KR | 100862561 | 10/2008 |
| RU | 2400592 | 9/2010 |
| RU | 132393 | 9/2013 |
| WO | WO 2001/065454 | 9/2001 |
| WO | WO2001/065454 | 9/2001 |
| WO | WO2011/038018 | 3/2011 |
| WO | WO 2011/038018 | 3/2011 |
| WO | WO 2011/055978 | 5/2011 |
| WO | WO2011055978 | 5/2011 |
| WO | WO 2013155661 | 10/2013 |
| WO | WO 2013155661 A1 | 10/2013 |
| WO | WO 2014072972 | 5/2014 |
| WO | WO 2014108267 | 7/2014 |
| WO | WO 2014/147361 | 9/2014 |
| WO | WO 2014131400 | 9/2014 |
| WO | WO2014147361 | 9/2014 |

OTHER PUBLICATIONS

Gilbert Held, Inter- and Intra-Vehicle Communications 1st Edition, Nov. 8, 2007, Auerbach ublications, XP055503113, ISBN: 978-1-4200-5221-3, pp. ToC, Ch01, 41-50, Ch03, 93-100, Ind.

Jack Erjavec, Automotive Technology: A Systems Approach, Feb. 21, 2014, Delmar Cengage Learning, XP055506654, ISBN: 978-1-133-61231-5, pp. ToC, 616-620, 647-651, 664-668.

Hermann Winner, Handbuch Fahrerassistenzsystem: Grundlagen, Komponenten und Systeme fur aktive Sicherheit und Komfort, Apr. 20, 2015, Springer XP055506347, ISBN: 978-3-658-05733-6, pp. ToC, Ch14, Ch26-Ch29, Ch38, Ch55, Ind.

EESR issued in EP 16793475.1 dated Sep. 21, 2018.

International Search Report and Written Opinion issued in PCT/US2016/066235 dated Mar. 27, 2017.

Azim Asma, et al.: "Layer-based supervised classification of moving objects in outdoor dynamic environment using 3D laser scanner", 2014 IEEE Intelligent Vehicles Symposium Proceedings, IEEE, Jun. 8, 2014, pp. 1408-1414.

Andres Serna et al.: "Detection, segmentation and classification of 3D urban objects using mathematical morphology and supervised learning", ISPRS Journal of Photogrammetry and Remote Sensing, vol. 93, 1, 2014, pp. 243-255, Amsterdam, NL.

EESR issued in EP 17169669.3 dated Sep. 13, 2017.

Office Action issued in CN 201680040538.2 dated Sep. 10, 2018.

Office Action issued in EP 17169669.3 dated Jun. 18, 2018.

Hrabar, "3D path planning and stereo-based obstacle avoidance for rotorcraft UAVs", Intelligent Robots and Systems, 2008, IROS 2008. IEEE/RSJ International Conference on, 9/22/200.

Hrabar, "An evaluation of stereo and laser-based range sensing for rotorcraft unmanned aerial vehicle obstacle avoidance", Journal of Field Robotics, vol. 29, No. 2, Oct. 18, 2011.

Ros, et al., "Vision-Based Offline-Online Perception Paradigm for Autonomous Driving", 2015 IEEE Winter Conference on Applications of Computer Vision, IEEE, Jan. 5, 2015.

IPRP issued in PCT/US2016/066235 dated Jun. 21, 2018.

(56) References Cited

OTHER PUBLICATIONS

International Search Report and Written Opinion issued in PCT/US2016/031929 dated Aug. 17, 2016.
Ansari et al., "Partial Shape Recognition: A Landmark-Based Approach", IEEE 1989, CH2809-2/89/000-0831, 6 pages.
International Search Report and Written Opinion for PCT/US2017/040532, dated Jan. 11, 2018, 16 pages.
International Search Report and Written Opinion for PCT/US2017/046796, dated Feb. 28, 2018, 7 pages.
International Search Report and Written Opinion for PCT/US2017/056277, dated Apr. 5. 2018, 7 pages.
Ansari, Partial Shape Recognition: IEEE 1989, A Landmark-Based Approach, CH2809-2/89/000/0831, 6 pags.
Azim et al., "Layer-Based Supervised Classification of Moving Objects in Outdoor Dynamic Environment Using 3D Laser Scanner", IEEE Intelligent Vehicles Symposium Proceedings, Jun. 8, 2014, pp. 1408-1414.
Erjavec, Jack, "Automotive Technology: A Systems Approach", Feb. 21, 2014, Delmar Cengage Learning, XP055506654, ISBN 978-1-133-61231-5, pp. 616-620, 647-651, 664-668.
Held, Gilbert Inter- and Intra- Vehicle Communications 1st Edition Nov. 8, 2007, Auerbach Publications, XP055503113, ISBN 978-1-4200-5221-3, Chapter 1, pp. 41-50, Chapter 3.
Hrabar et al., "An Evaluation of Stereo and Laser-Based Range Sensing for Rotorcraft Unmanned Aerial Vehicle Obstacle Avoidance", Journal of Field Robotics, vol. 29, No. 2, Oct. 18, 2011, 25 pages.
Hraber et al., "3D Path Planning and Stereo-Based Obstacle Avoidance for Rotorcraft UAVs" Intelligent Robots and Systems, IEEE International Conference on intelligent Robots and Systems, Sep. 22, 2008, 8 pages.
Ros et al., "Vision-Based Offline-Online Perception Paradigm for Autonomous Driving", IEEE Winter Conference on Applications of Computer Vision, Jan. 5, 2015, 8 pages.
Serna et al., "Detection, Segmentation and Classification of 3D Urban Objects Using Mathematical Morphology and Supervised Learning", ISPRS Journal of Photogrammetry and Remote Sensing, vol. 93, Jul. 1, 2014, Amsterdam, Netherlands, pp. 243-255.
Winner, Hermann, "Handbuch Fahrerassistanzsystem: Grundlagen, Komponenten und Systeme fur Aktive Sicherheit und Komfort", Apr. 20, 2015, Springer, 132 pages.
Extended European Search Report for Application No. EP16793475.1 dated Sep. 21, 2018, 14 pages.
Extended European Search Report for Application No. EP17169669.3 dated Sep. 13, 2019, 10 pages.
International Search Report and Written Opinion for Application No. PCT/US2016/066235 dated Mar. 27, 2017, 46 pages.
International Search Report and Written Opinion for Application No. PCT/US2016/031929 dated Aug. 17, 2016, 12 pages.
International Search Report and Written Opinion for Application No. PCT/US2017/046796 dated Feb. 28, 2018, 7 pages.
International Search Report and Written Opinion for Application No. PCT/US2017/056277 dated Apr. 5, 2018, 7 pages.
International Search Report and Written Opinion for Application No. PCT/US2017/040532 dated Jan. 11, 2018, 16 pages.
International Preliminary Report on Patentability for Application No. PCT/2016/066235 dated Jun. 21, 2018, 42 pages.
Office Action for CN201680040538.2, dated Sep. 10, 2018, 38 pages.
Office Action for CN201710311393.1, dated Nov. 12, 2018, 29 pages.
Office Action for EP17169669.3, dated Jun. 18, 2018, 7 pages.

* cited by examiner

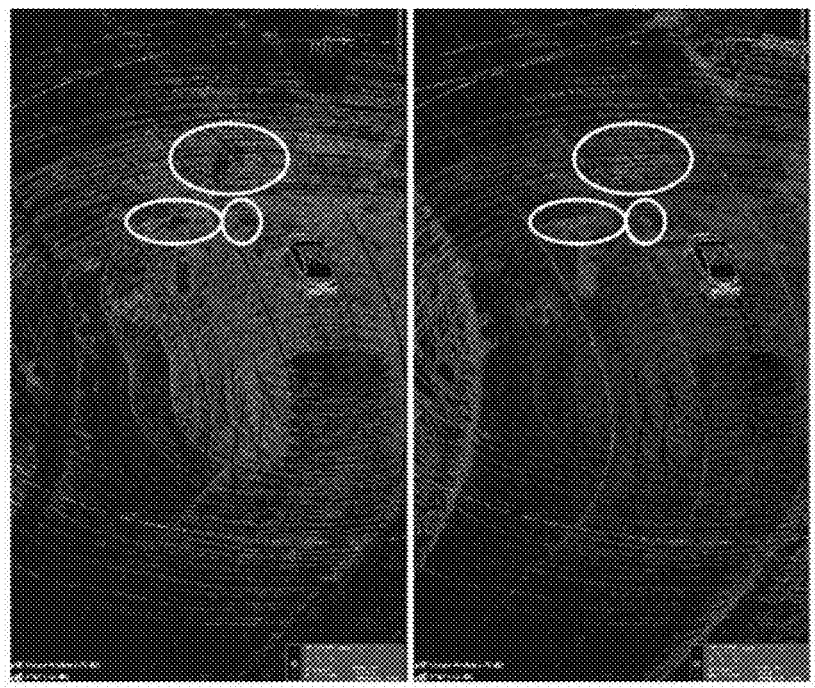
FIG. 13B FIG. 13C

VEHICLE TRACTION MAP FOR AUTONOMOUS VEHICLES

RELATED APPLICATIONS

This application claims benefit of priority to provisional U.S. Patent Application No. 62/265,960 filed Dec. 10, 2015. This application is also a continuation-in-part of U.S. patent application Ser. No. 15/376,270, filed Dec. 12, 2016, which claims priority to U.S. Patent Application No. 62/265,960 filed Dec. 10, 2015; each of the aforementioned priority applications being hereby incorporated by reference.

TECHNICAL FIELD

Examples described herein relate to a vehicle traction map for autonomous vehicles.

BACKGROUND

Vehicles are increasingly implementing autonomous control. Many human-driven vehicles, for example, have modes in which the vehicle can follow in a lane and change lanes.

Fully autonomous vehicles refer to vehicles which can replace human drivers with sensors and computer-implemented intelligence, sensors and other automation technology. Under existing technology, autonomous vehicles can readily handle driving with other vehicles on roadways such as highways.

Autonomous vehicles, whether human-driven hybrids or fully autonomous, operate using data that provides a machine understanding of their surrounding area.

BRIEF DESCRIPTION OF THE DRAWINGS

FIG. 13A through FIG. 13C describe examples of the use of LiDar to detect accumulated precipitation such as ice on a road network.

DETAILED DESCRIPTION

Figure 1:
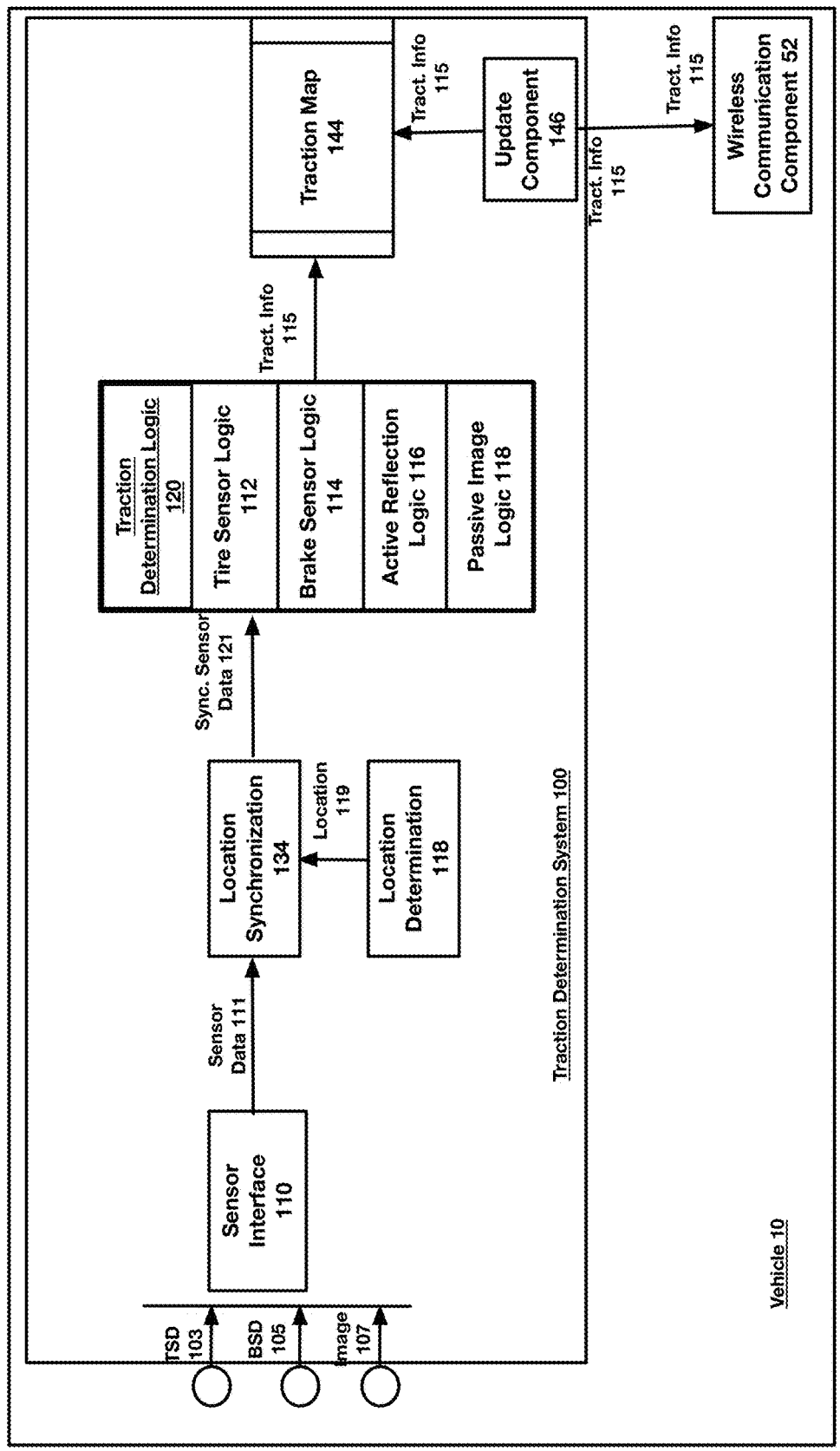
FIG. 1 illustrates an example traction determination system for a vehicle.

Examples herein describe a traction determination system for use with autonomous vehicles. Among other aspects, vehicles equipped with resources for detecting a traction value of a road surface may transmit traction information to a network service. The vehicle may perform a variety of operations upon determining a traction value of a road surface. For example, the vehicle can plan a trajectory based on detecting a low traction region in front of the vehicle. Alternatively, the vehicle may transmit the traction information to a network service, which may provide a traction map for multiple vehicles operating in a common geographic region.

In some examples, autonomous vehicles may operate within a geographic region (e.g., city). When events occur (e.g., onset of inclement weather) which may change the traction on the roadway, the vehicles may collectively combine with a network service to create a traction map that identifies a traction value of a road segment. The vehicles may continuously update the traction map during the inclement weather period.

In other aspects, a network service may receive and process traction information for locations of a road network from multiple vehicles. The network service may instruct vehicles on various aspects of vehicle operation based on the traction determination of the locations of the road network.

In some examples, a vehicle is operable to determine a traction value for a surface of a road segment, and associates the traction value with a location of the surface. The vehicle stores the traction value and location as part of a traction map.

According to another aspect, a vehicle determines an expected traction value for a region of a road segment on which the vehicle is approaching. A set of motion parameters may be determined based on the expected traction value. A vehicle control operation can be implemented based on the determined set of motion parameters.

Still further, in some vehicles, a vehicle determines an expected traction value for a region of a road segment on which the vehicle is approaching. A set of motion parameters may be determined based on the expected traction value. A vehicle control operation can be implemented based on the determined set of motion parameters.

In some examples, a control system for a vehicle provides for directing light onto a region of a road surface on which the vehicle is moving. A variation in a characteristic of a reflection of the directed light is determined. Accumulated precipitation is detected on at least the region of the road based on the determined variation.

Still further, some examples provide for an automated or autonomous vehicle obtains measurements from at least a first tire sensor, where the measurements reflect a grip state and/or grip margin. The tire sensor information be synchronized with location information, identifying a location where the tire sensor information was obtained. 1

In variations, a computer system maintains, for a given geographic region, a data structure that identifies a traction value for each of a plurality of locations of a road network within a geographic region. At least of a start or destination location is determined for the trip. The computer system may plan the trip, including selecting at least one of a route or a vehicle to use for the trip, based on the traction values of one or more of the plurality of locations.

In other examples, a computer system operates to determine a traction value for each of a plurality of regions of the road network. A region of the road network for which the traction value is unknown is identified. A vehicle is directed to operate over the region of the road network to obtain additional data that is indicative of a current traction value.

Still further, in other examples, a computer system operates to determine a traction value for each of a plurality of regions of a road network. The computer system identifies a region of the road network for which the traction value is known. The computer system may direct a vehicle to operate over a region of the road network where the traction value is known, in order to obtain sensor data that is indicative of a traction capability of the vehicle.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Numerous examples are referenced herein in context of an autonomous vehicle. An autonomous vehicle refers to any vehicle which is operated in a state of automation with respect to steering and propulsion. Different levels of autonomy may exist with respect to autonomous vehicles. For example, some vehicles today enable automation in limited scenarios, such as on highways, provided that drivers are present in the vehicle. More advanced autonomous vehicles drive without any human driver inside the vehicle. Such vehicles often are required to make advance determinations regarding how the vehicle is behave given challenging surroundings of the vehicle environment.

Map System

FIG. 1 illustrates an example traction determination system for a vehicle. As shown by an example of FIG. 1, a traction determination system 100 can be implemented on any of multiple types of vehicles, including autonomous vehicles which can operate without human drivers. A traction determination system 100, as shown by an example of FIG. 1, may operate to determine and maintain traction information about a road segment on which the vehicle travels. As described with various examples, the traction information can be utilized in connection with performing vehicle operations, such as propulsion, braking and steering. Additionally, in some variations, the vehicle 10 may determine and communicate traction information to a remote source, such as a network service or another vehicle.

The traction determination system 100 may be implemented as a component or module of a central control system for a vehicle. In variations, the traction determination system 100 may be implemented as part of a distributed control system of the vehicle 10. Still further, the traction determination system 100 may be implemented in part on a network service, using information provided from the vehicle 10.

In an example of FIG. 1, the traction determination system 100 includes multiple sensor interfaces 110 and traction determination logic 120. The sensor interfaces 110 may receive sensor data 111 from one or more types of sensors of the vehicle. The sensor interfaces 110 may include memory resources that cache, or otherwise retain incoming sensor data for purpose of correlating incoming data to traction information. In this way, at least some types of sensor data 111 can have multiple purposes, including primary purposes other than use for traction determination. The traction determination logic 120 may process the incoming sensor data in order to determine traction information 115. At least one of the sensor interfaces 110 110 or the traction determination logic 120 may identify the vehicle location 119 from a location determination component 118. In some examples, the location determination component 118 may correspond to a GPS component. In variations, the location determination component 118 corresponds to a localization component, which as described with an example of FIG. 3, can determine the location of the vehicle with higher precision and granularity (as compared to conventional GPS).

In an example of FIG. 1, a location synchronization component 134 synchronizes sensor data 111 with the vehicle's location 119, based on a determination where sensor data 111 was captured. For example, the traction determination logic 120 may receive synchronized sensor data 121, so that the traction information 115 identifies a quantum of traction information (e.g., traction value or class) in association with the location 119 where that traction value was detected by the vehicle. The traction determination logic 120 may store the traction information 115 (e.g., traction value, traction range of values, traction type), in association with the vehicle's location 119 where the traction determination was made.

In one implementation, the sensor interfaces 110 can receive sensor data to directly measure traction values of the road segment as the vehicle traverses the location of measurement. By way of example, sensors which can make direct measurements that are correlative to traction values at a given location can include tire sensors, which measure the amount of grip which the tires place on the roadway, as well as antilock brake system ("ABS") sensors, drive train sensors and/or wheel sensors which can detect wheel slip. In an example of FIG. 1, the sensor data for directly determining the traction values of a road segment include tire sensor data 103 and/or ABS sensor data 105.

In variations, the traction determination logic 120 implements one or multiple traction determination processes, to determine traction information 115 which is then stored as part of the traction map 144. The traction determination logic 120 may make direct measurements of traction information for a given road segment (e.g., based on vehicle traversing over the road segment where traction is being determined). As described with examples provided below, the traction information 115 that is determined from the traction determination logic 120 may also make indirect measurements of traction, where LiDar or imagery makes traction determinations for an expectation of traction on a road segment that is in front of the vehicle 10. The traction information 115 may correspond to a specific traction value, range of value, or classification. In one implementation, the traction determination logic 120 may make a binary or trinary determination as to whether the vehicle experienced a sufficient amount of traction when traveling over a road segment. For example, when inclement conditions occur, the vehicle 10 may determine, for individual road segments, whether there is sufficient traction for the vehicle to be safely operable, borderline traction by which the vehicle may be marginally safe, and less than safe levels of traction. In variations, the traction determination logic 120 determines a range (from multiple possible ranges) for the traction information 115, with each traction value range representing, for example, a type of road condition, such as a type of accumulated precipitation (e.g., rain, heavy rain, sleet, snow, ice). Still further, the traction determination logic 120 may determine traction information 115 that corresponds to specific traction values, such as traction values that correlate directly to a coefficient of friction for the road surface, as experienced by the vehicle 10.

In one implementation, the traction determination logic 120 includes tire sensor logic 112. At least one sensor interface 110 receives tire sensor data 103 from tire sensors embedded in the tires of the vehicle 10. The tire sensor data 103 may reflect a grip state or grip value of individual tires of the vehicle 10 with respect to the road segment. The grip state or grip value may reflect a proximity of the particular tire to a threshold where the tire is not gripped on the road. In such examples, the grip state and grip value are correlative to traction information. The correlation may be categorical, with higher granularity of correlation being provided by modeling.

In some variations, the traction determination logic 120 includes brake sensor logic 114 to determine traction information brake sensor data 105 provided by brake sensors of the vehicle. At least one sensor interface receives antilock brake system ("ABS sensor data 105"). The ABS sensor data may be determined from sensors of the brake system (or alternatively drivetrain, wheelwell or shaft sensors), which can monitor for slippage, torque and other physical events of a monitored wheel. The ABS sensor data 105 may directly correlate to a coefficient of friction and/or traction values. Accordingly, the ABS sensor data 105 may be based on data generated from sensors provided with anti-locking mechanisms of the vehicle's brakes. With either the tire sensor logic 112 or brake sensor logic 114, the traction information may correspond to the amount of friction that the vehicle experiences on a road segment that the vehicle travels over.

While some examples illustrate use of brake sensors and/or tire sensors to directly determine traction information, in variations, the traction values may be determined from other sensor measurements. In one implementation, the traction determination component 120 determines the traction information 115 by comparing throttle and braking commands to accelerations, as measured by an accelerometer, gyroscope or combination thereof (e.g., inertial mass unit). The throttle and braking command 120 may correspond to a specific acceleration, which if not met (as determined by IMU etc.), would indicate an occurrence of wheel slip and loss of traction. In similar fashion, an alternative variation would provide for the traction determination component to compare throttle and braking commands to an expected velocity of the vehicle, and the inability of the vehicle to reach the velocity would be indicative of wheel slip and loss of traction.

The sensor interfaces 110 may also include sensor interfaces for receiving and/or processing image-based data 107 which may capture visual characteristics of the road ahead of the vehicle 10. In one implementation, the image-based data 107 includes LiDar data, corresponding to reflectance of laser or other focused light which is directed onto a road surface. In some examples, the vehicle 10 may utilize LiDar as a primary sensory component, from which objects on the roadway and surrounding environment can be viewed and analyzed. The LiDar may, for example, spin in a 360 degree arc about the vehicle, as part of a process to build vertical slices of perceived data which elevate vertically from the roadway. At a given distance away, the laser generated from the LiDar can be directed onto the surface of the roadway, from which the image elevates vertically. the sensor interfaces 110 may include LiDar data which is captured when the laser is directed to the road surface. In such cases, the vehicle 10 may be equipped with a dual-use LiDar, in what data from the road surface level can be used to determine traction information, while elevated data can be used to perceive objects and the surrounding area.

With respect to LiDar and other actively captured image data, the traction determination logic 120 includes active reflection logic 116, which can process a pattern or variation in an intensity and/or power of the reflected signal from the road surface. The active reflection logic 116 may incorporate one or more traction models which map a detected pattern/variation to a traction value or range. As an addition or alternative, the active reflection logic 116 may map the detected pattern to a type of accumulated precipitation, such as provided with rain, snow, sleet, or ice.

Still further, in some examples, the sensor interfaces 110 may include sensor interfaces for receiving and/or processing passive image data 107 from cameras that are mounted on or with the vehicle 10. According to some examples, the vehicle 10 can operate some cameras in a mode in which image data 107 is visual and depicts road surface which the vehicle is approaching on a given road segment. The traction determination logic 120 may include passive reflection logic 116 which recognizes visual characteristics of the image data, and maps visual characteristics detected from the image data to specific types of precipitation. The passive reflection logic 116 may include models which map visible features of the road surface with a range of traction values. For example, the presence of white in various shades (e.g., grey) on the roadway can be mapped to presence of snow on the roadway, or presence of a type of snow (e.g., packed snow, fresh snow, wet snow, accumulating snow). Each of the perceived conditions may be associated with a traction value range, which may be provided as the output.

The traction determination logic 120 can determine and store traction information 115 in association with corresponding locations 119 where the sensor information was determined. In one implementation, the traction determination logic 120 maintains a traction map 144 of a road network, where individual locations of the road network are associated with traction values or classifications, as determined from sensor information of the vehicle 10. In variations, a remote source (e.g., traction determination service 200) transmits at least a portion of the traction map 144 to the vehicle 10. The remote source may determine the traction information from sensors of multiple vehicles operating in a geographic region of the road network.

Figure 2:
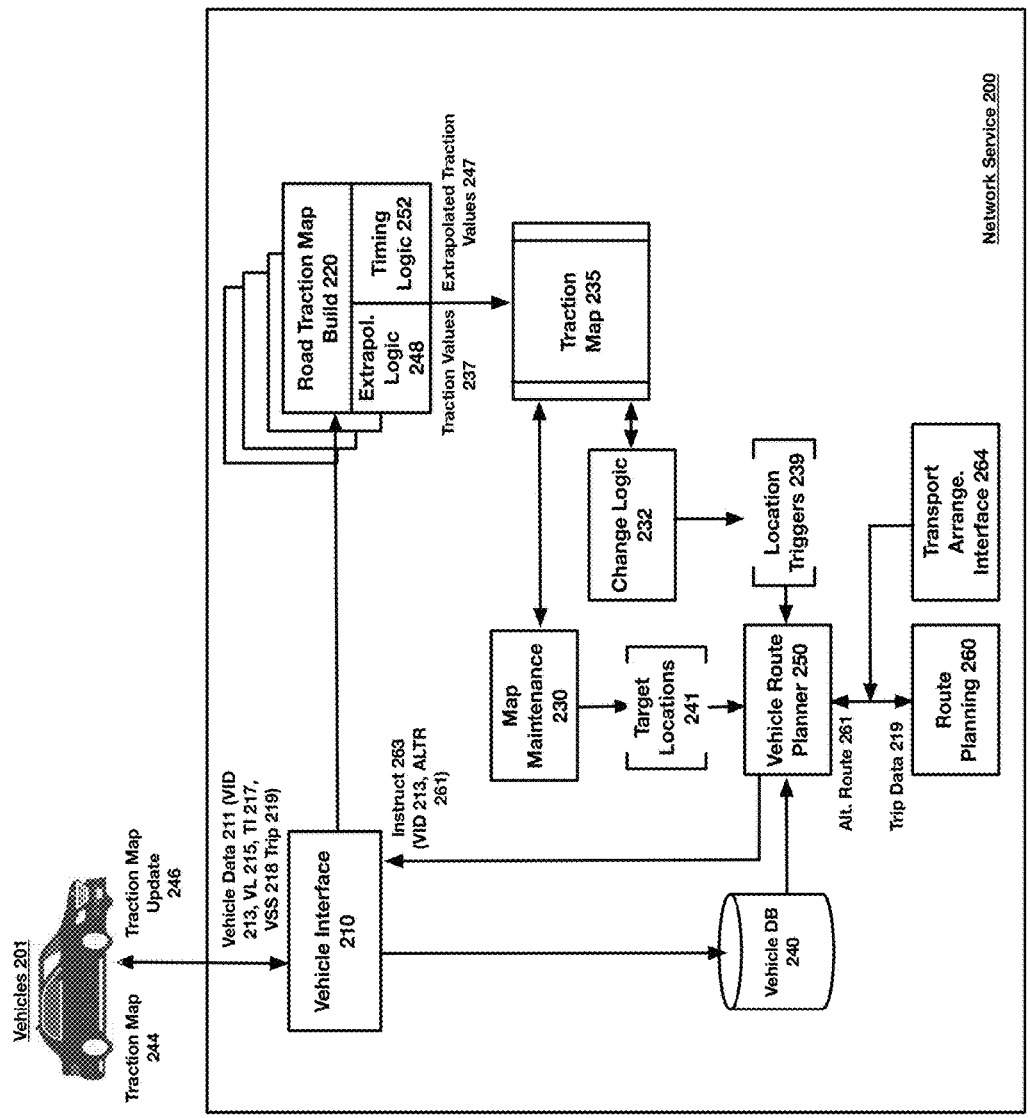
FIG. 2 illustrates a traction mapping service for communicating traction information from and to multiple vehicles operating on a road network of a geographic region.

According to some examples, the traction determination component includes an update component 146 which receives traction information 115 from a network service 200 (see FIG. 2). The network service 200 may receive and process traction information from other vehicles, and then communicate updates to the vehicle 10 and other vehicles of the fleet. The updates from the network service can be received by the update component 146 (via a vehicle wireless communication component 52) and incorporated into the traction map 144 as the vehicle 10 progresses through a trip. The update component may also communicate results of the traction determination component 120 to the network service 120. For example, the update component 146 can scan the traction map 144 for new values, and then transmit the newly determined traction information to the network service 200 via the communication component 52.

Figure 3:
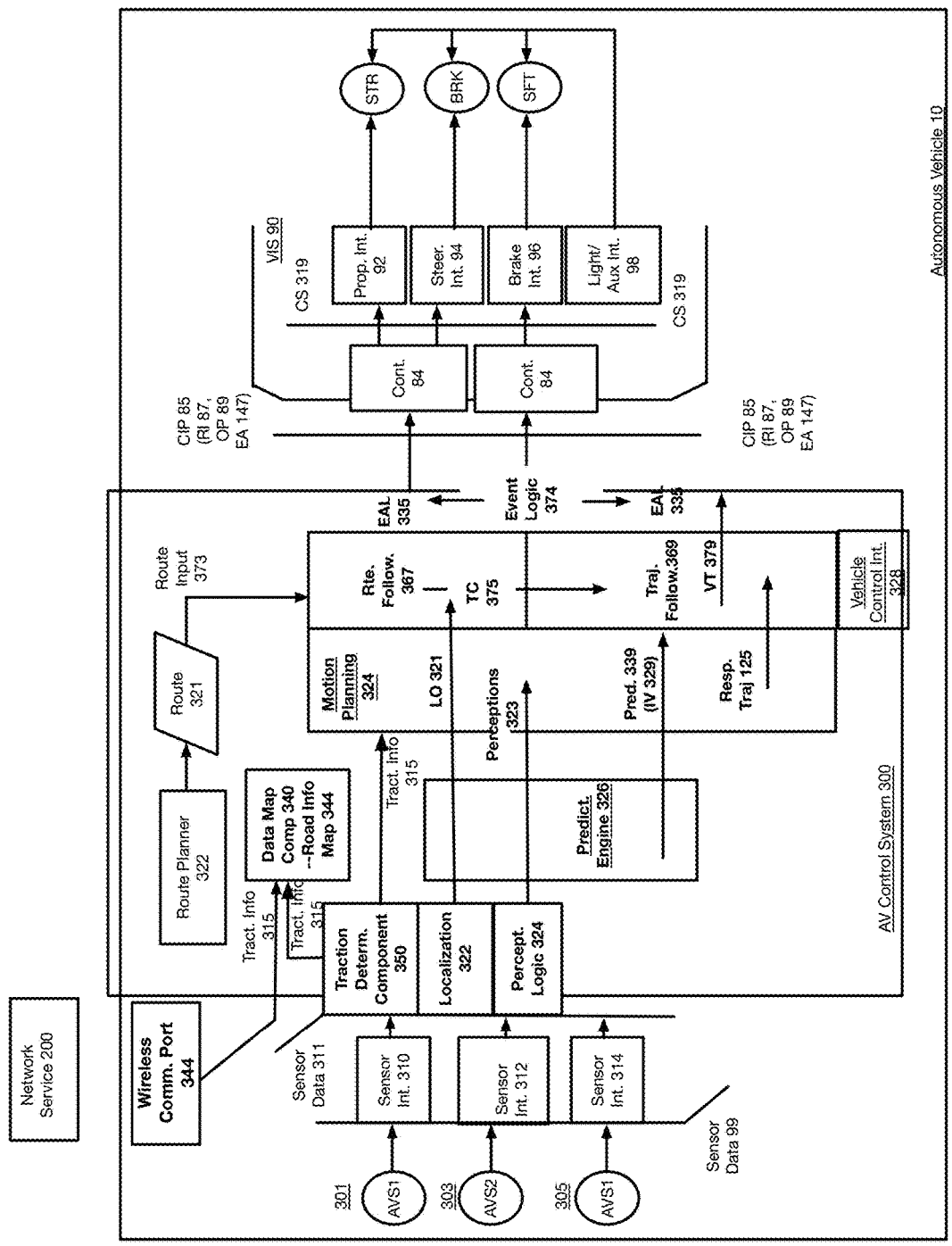
FIG. 3 illustrates an autonomous vehicle control system that utilizes traction information, according to some examples.

As described with an example of FIG. 3, a control system 300 of vehicle 10 may use the traction map 144 to determine an expectation of traction on a given road segment which is in the immediate trajectory of the vehicle 10. As an addition or alternative, the expectation of traction may be a determination made from output of active reflection logic 114 and/or passive reflection data 116. Based on the expectation of traction, the control system may perform vehicle operations such as (i) changing the immediate or planned (e.g., contingent) trajectory of the vehicle, and/or (ii) operating the vehicle within a modified (e.g., reduced) velocity or acceleration profile.

In some examples, when the vehicle traverses a location of the traction map 144, the update component 146 compares an expected traction value to an actual traction value measured through sensors which rely on interaction with the corresponding road segment. For example, the vehicle 10 may implement the traction determination system 100 to determine an expected traction value for an upcoming location of a road segment using a LiDar. As the vehicle passes over the location, the traction determination system 100 may make a direct traction determination, using, for example, sensor data 111 from tire sensors or ABS sensors. The difference between the expected and direct traction information can be used as feedback for training models used with active reflection logic 114 and/or passive reflection logic 116.

In some variations, the update component 146 may compare an expected traction value from the traction map 144. In such implementations, the traction values of the traction map 144 may reflect traction information provided from the network service 200.

In variations, the traction values of the traction map 144 may be based on data communicated from the network service 200, corresponding to traction information communicated from other vehicles for specific locations of the road network. When the vehicle traverses a given location, and the difference between the expected and direct traction value at that location is above a threshold, the traction map 144 may be updated on the vehicle 10. In some variations, the update component 146 may also determine when traction measurements of the vehicle are different (e.g., above a comparative threshold) from the traction values provided from the network service 200. In such cases, the update component 146 may selectively update the network service 200 when the traction information is determined to be different than those expected from the network service.

FIG. 2 illustrates a traction mapping service for communicating traction information from and to multiple vehicles operating on a road network of a geographic region. A network service 200 can be implemented using one or more network computers, such as a server, or a combination of servers, which provide a traction mapping service for multiple vehicles that operate in a given geographic region. According to some examples, the network service 200 is provided as part of a transport arrangement service, in order to provide updated data for traction maps which are maintained on individual vehicles which provide transport services through the transport arrangement service. Thus, for example, the vehicles which communicate with the traction mapping service 200 may provide transport services (e.g., transport people, package delivery, etc.) through a transport arrangement service.

With reference to an example of FIG. 2, the network service 200 may include a vehicle interface 210, traction map builder 220, map maintenance logic 230, and a vehicle database 240. The vehicle interface 210 receives vehicle data 211 from individual vehicles 201 which operate on the road network of a given geographic region. In some examples, the vehicles 201 operate to provide transport services through a transport arrangement service. Still further, some examples provide that at least some of the vehicles 201 which communicate with the network service 200 are autonomous vehicles. The traction mapping service 200 generates traction maps 244 and/or traction map updates 246 for individual vehicles which communicate with the traction mapping service 200.

The vehicle data 211 may include a vehicle identifier 213, a vehicle location 215, and traction information 217 in association with the corresponding locations where the traction information was determined. The traction information 217 may be determined from, for example, the traction map 144 maintained on the individual vehicles. The traction information 217 communicated from the individual vehicles may be determined from, for example, tire sensor logic 112, ABS sensor logic 114, active reflection logic 116 (see FIG. 1) and passive reflection logic 116 (see FIG. 1). In some examples, the traction information 217 may also be communicated with contextual information, including environmental conditions (e.g., during or after rain, snow, ice, temperature, wind, amount of sunlight) as well as contextual information (e.g., time of day, day of year, slope of road where one or more traction values are determined, etc.).

In some variations, the vehicle data 211 may include a vehicle service state 218 to identify, for example, whether the vehicle is on trip or available for assignment. Still further, in some variations, the vehicle data 211 may include trip information 219, such as, for example, a route or destination a vehicle is traveling on. In other variations, the vehicle data 211 may also recent trips of the vehicle, and previous instances when a traction map update 244 was provided to the vehicle.

The traction map builder 220 receives the traction information 217 communicated from the vehicles. The traction map builder 220 repeatedly, or continuously implements processes to collect traction information 217 from vehicles 201, and to populate a geographic data structure (e.g., road network map) with traction values that are determined in part from traction information 217 provided by the vehicles. The traction map builder 220 may aggregate traction information 217 from multiple vehicles that operate on a road network of a geographic region to populate a traction map 235 with traction values 237. In some examples, the traction values 237 may correspond to a quantity or quantity range that is based on the coefficient of friction of the road surface. The traction values 237 may also correlate to an amount and/or type of precipitation accumulation. For example, on a given road segment of a given type, accumulation of rain and snow may each have a corresponding range of traction values, while the formation of ice may have another range of traction value. The traction map 235 may identify numerous locations of the road network where traction information (e.g., recent traction value) is known. For a given location, the traction map 235 may identify, for example, one or more sets of traction values 237 provided from one or multiple vehicles 201 in a relevant time period. The locations which are associated with traction values within the traction map 235 may represent areas, or regions of road segments.

In some variations, the traction map builder 220 receives and applies information about the environmental condition (e.g., weather reports) and context from independent sources. Still further, the traction map builder 220 can aggregate traction information 217 from multiple vehicles 201 that traverse a common set of road segments in a given time frame, such as during a time interval in which traction values are not expected to deviate (e.g., when weather is sunny and dry). In some implementations, when traction information 217 communicated from the vehicles indicates a change (e.g., such as with rainfall), change logic 232 marks the instance of change. In variations, the change logic 232 can be triggered by changes in weather conditions, as determined by contextual information provided from the vehicles or from other sources.

Accordingly, in some examples, the traction map 235 may make available, for other vehicles, traction values 237 which are deemed reliable, or most reliable. When weather conditions have changed, the most reliable traction value 237 for a given location may be provided by the most recent vehicle 201 which traverses that location. In variations, the traction value 237 for a given location may be determined from, for example, a running or weighted average, given a particular environmental condition (e.g., light rain, heavy rain, snow, sunny and dry) and/or context (e.g., day and time of year).

In some examples, the change logic 232 may mark location triggers 239, corresponding to locations of the road network where traction values 237 have been updated. The locations may be used to identify which vehicles require an update of their respective traction map.

In some examples, a maintenance component 234 may also mark target locations 241 of the road network where the traction map 235 is deemed to lack sufficient traction information. The insufficiency may be a result of the passage of time, and/or changes to the environmental conditions. Thus, in some examples, the maintenance component 234 basis determinations of target locations 241 on recency and/or detected changes to weather conditions. In other examples, the target locations 241 may be identified as regions of the road network where traction measurements have not previously been made, or locations of the road network where discrepancy or uncertainty as to traction value exists.

According to other examples, the traction map builder 220 builds a portion of the traction map 235 using extrapolation and modeling. For example, in a given geographic region, the number of vehicles 201 may which operate may be insufficient to populate the traction map 235 with the desired granularity and/or refresh frequency. For less frequented locations, for example, extrapolation logic 248 can be implemented to determine extrapolated traction values 247 for given locations of the traction map 235 based on traction values 237 of highly frequented locations. The extrapolation logic 248 may determine extrapolation models that correlate locations or segments of a road network, based on factors such as (i) proximity of a suitable location (e.g., highly frequented location) for which the traction value is known ("known location"), (ii) commonality of the road surface type as between the extrapolated location and the known location, (iii) commonality of a degree of road slope as between the extrapolated location and the known location, and/or (iv) commonality of contextual parameters as between the extrapolated location and the known location.

Additionally, the traction map builder 220 can use timing logic 252 to model a known traction value at a given location over time to determine a time-based extrapolated traction value. The timing logic 252 may base its model on, for example, observance of environmental conditions and contextual parameters at or near the given location. For example, timing logic 252 can estimate the accumulation of ice on a given road segment given presence of road slope, temperature, and level of accumulated precipitation in nearby regions. As another example, the timing logic 252 can predict loss of traction due to presence of shade or wind in a given road segment.

The models used by the extrapolation logic 248 and the timing logic 252 can be verified and tuned over time with traction information communicated from vehicles. Thus, the reliability of the extrapolation logic 248 and the timing logic 252 can be ascertained overtime.

According to some examples, the vehicle monitor 250 may monitor the vehicle data 211 of the vehicle database 240 to determine locations of vehicles on trips. The vehicle monitor 250 may generate a traction map update 246 when vehicles 201 are in use and near location triggers 239. As an addition or alternative, the vehicle monitor 250 may generate the traction map update 246 when vehicles 201 are on trips that are, or may, pass through the location triggers 239.

In variations, the vehicle monitor 250 may also identify those vehicles of the vehicle database 240 which are on trips (e.g., using trip data 219) that pass through, travel near target locations 241. In some examples, the target locations 241 may be associated with a safety parameter which can be based on, for example, the uncertainty of the traction value (e.g., most unsafe traction value possible within a standard deviation). In such cases, the vehicle monitor 250 may access route planning logic 260 to determine alternative routes 261 to the vehicle's planned trip, based on the vehicle's current location and/or destination, as indicated by the trip data 219. The vehicle monitor 250 can signal, via the vehicle interface 210, instructions 263 to the respective vehicles using vehicle identifier 213, to direct the corresponding vehicle to avoid the particular target locations 241 when the vehicle service state 215 indicates the respective vehicles are in a state of use (e.g., carrying human passengers for transport requests). The instructions 263 may also identify the alternative route 261 for the vehicle.

Conversely, in some examples, the vehicle monitor 250 may select vehicles to route through the target locations 241 so that the network service 200 obtains target information 217 for those locations. The selection of the vehicles may correspond to those that have no human passengers (e.g., passenger dropped off). The selection of vehicles to route through the target locations 241 may also be based on (i) proximity of current vehicle route (as indicated by the trip data 219) to target location 241, and (ii) type of vehicle (e.g., capability of the vehicle to withstand extreme traction condition). In this way, the traction map 235 can be updated through intelligent routing of the autonomous vehicles.

The vehicle monitor 250 may also determine a recency of a relevant portion of a vehicle's local traction map 145 (see FIG. 1, based on factors such as the duration of time since the last traction map update 246 and/or change in environmental conditions since the last traction map update 246 was provided to the vehicle 201.

In some implementations, the vehicle route planner 250 may interface with other services, such as an interface 264 for a transport arrangement service. Given route information 265 as input (e.g., destination, current location, and/or planned route), the vehicle route planner 250 can select the vehicle based on vehicle capability and/or recently of the vehicle's local traction map 145. In some variations, the vehicle route planner 250 can provide the transportation arrangement interface 264 with alternative routes 261, or direct the selected vehicle through or away a particular location based on known traction values of the location.

FIG. 3 illustrates an autonomous vehicle control system that utilizes traction information, according to some examples. In an example of FIG. 3, a control system 300 is used to autonomously operate vehicle 10 in a given geographic region for a variety of purposes, such as transport services (e.g., transport of humans, delivery services, etc.). In examples described, an autonomously driven vehicle can operate without human control. For example, in the context of automobiles, an autonomously driven vehicle can steer, accelerate, shift, brake and operate lighting components. Some variations also recognize that an autonomous-capable vehicle can be operated either autonomously or manually.

In one implementation, the control system 300 can utilize specific sensor resources in order to intelligently operate the vehicle 10 in most common driving situations. For example, the control system 300 can operate the vehicle 10 by autonomously steering, accelerating and braking the vehicle 10 as the vehicle progresses to a destination. The control system 300 can perform vehicle control actions (e.g., braking, steering, accelerating) and route planning using sensor information, as well as other inputs (e.g., transmissions from remote or local human operators, network communication from other vehicles, etc.).

In an example of FIG. 3, the control system 300 includes a computer or processing system which operates to process sensor data that is obtained on the vehicle with respect to a road segment that the vehicle is about to drive on. The sensor data can be used to determine actions which are to be performed by the vehicle 10 in order for the vehicle to continue on a route to a destination. In some variations, the control system 300 can include other functionality, such as wireless communication capabilities as provided with wireless communication component 354, to send and/or receive wireless communications with one or more remote sources. In controlling the vehicle, the control system 300 can issue instructions and data, shown as commands 85, which programmatically controls various electromechanical interfaces of the vehicle 10. The commands 85 can serve to control operational aspects of the vehicle 10, including propulsion, braking, steering, and auxiliary behavior (e.g., turning lights on).

Examples recognize that environmental conditions can pose significant challenges to autonomous vehicles 10. In particular, precipitation (e.g., rain, hail, snow, ice) has potential to affect a variety of operations which the vehicle 10 may need to perform. Among other hazards, accumulated precipitation can affect the traction which vehicles on the roadway experience. The loss of traction can cause many vehicles to experience a fringe operating condition, such as hydroplaning or an uncontrolled slide. When low traction regions are present on a road, the ability for the vehicle to detect the low traction region becomes advantageous, as the vehicle can avoid or plan around the region. According to some examples, autonomous vehicles are equipped with resources that enable accurate prediction of the amount of traction on the road surface. Examples further provide for an autonomous vehicle that can be aware of various types of precipitation accumulation on the road surface, so that the vehicle can avoid an unexpected loss of traction on the roadway.

The autonomous vehicle 10 can be equipped with multiple types of sensors 301, 303, 305, which combine to provide a computerized perception of the roadway, as well as the space and environment above and surrounding the vehicle 10. Likewise, the control system 300 can operate within the autonomous vehicle 10 to receive sensor data from the collection of sensors 301, 303, 305, and to control various electromechanical interfaces for operating the vehicle on roadways.

In more detail, the sensors 301, 303, 305 operate to collectively obtain a complete sensor view around the vehicle 10. The sensors 301, 303, 305 can include sensors which operate to detect conditions about the road surface (e.g., tire sensors to measure a grip state or value of the road surface), sensors which measure internal working or feedback experienced with operation of the vehicle (e.g., brake sensors), and/or sensors which perceive objects on or near the roadway (e.g., cameras, LiDar, sonar). In the context of specific examples described, the sensors (collectively sensors 301, 303, 305) may include (i) passive image sensors (e.g., video camera, stereoscopic camera, long range camera), capable of detecting imagery which includes reflectance from the road surface and the environment, (ii) active light sensors 303 (e.g., LiDar), which direct light onto an area in front of the vehicle (e.g., approaching road surface) to measure a return reflectance, and (iii) physical sensors (e.g., tire sensors, brake sensors) which measure a characteristic of the road or vehicle in response to actual physical contact between the vehicle and the road.

Each of the sensors 301, 303, 305 can communicate with, or utilize a corresponding sensor interface 310, 312, 314. Each of the sensor interfaces 310, 312, 314 can include, for example, hardware and/or other logical component which is coupled or otherwise provided with the respective sensor. The sensor interfaces 310, 312, 314 can include logic, such as provided with hardware and/or programming, to process raw sensor data 99 from a respective sensor 301, 303, 305. In some examples, the sensor interfaces 310, 312, 314 can include a dedicated processing resource, such as provided with a field programmable gate array ("FPGA") which receives and/or processes raw image data from the camera sensor. Both raw and processed sensor data 99, 311 can be used by the control system 300 to control operations of the 10. In some examples, the control system 300 implements programmatic controls over a vehicle interface subsystem. The vehicle interface subsystem 90 can include or control multiple interfaces to control mechanisms of the vehicle 10. The vehicle interface subsystem 90 can include a propulsion interface 92 to electrically (or through programming) control a propulsion component (e.g., a gas pedal), a steering interface 94 for a steering mechanism, a braking interface 96 for a braking component, and lighting/auxiliary interface 98 for exterior lights of the vehicle. The vehicle interface subsystem 90 and/or control system 300 can include one or more controllers 84 which receive one or more commands 85 from the control system 300. The commands 85 can include route information 87 and one or more operational parameters 89 which specify an operational state of the vehicle (e.g., desired speed and pose, acceleration, etc.).

The controller(s) 84 generate control signals 319 in response to receiving the commands 85 for one or more of the vehicle interfaces 92, 94, 96, 98. The controllers 84 use the commands 85 as input to control propulsion, steering, braking and/or other vehicle behavior while the autonomous vehicle 10 follows a route. Thus, while the vehicle 10 may follow a route, the controller(s) 84 can continuously adjust and alter the movement of the vehicle in response receiving a corresponding set of commands 85 from the control system 300. Absent events or conditions which affect the confidence of the vehicle in safely progressing on the route, the control system 300 can generate additional commands 85 from which the controller(s) 84 can generate various vehicle control signals 319 for the different interfaces of the vehicle interface subsystem 90.

According to examples, the commands 85 can specify actions that are to be performed by the vehicle 10. The actions can correlate to one or multiple vehicle control mechanisms (e.g., steering mechanism, brakes, etc.). The commands 85 can specify the actions, along with attributes such as magnitude, duration, directionality or other operational characteristic of the vehicle 10. By way of example, the commands 85 generated from the control system 300 can specify a relative location of a road segment which the autonomous vehicle 10 is to occupy while in motion (e.g., change lanes, move to center divider or towards shoulder, turn vehicle etc.). As other examples, the commands 85 can specify a speed, a change in acceleration (or deceleration) from braking or accelerating, a turning action, or a state change of exterior lighting or other components. The controllers 84 translate the commands 85 into control signals 319 for a corresponding interface of the vehicle interface subsystem 90. The control signals 319 can take the form of electrical signals which correlate to the specified vehicle action by virtue of electrical characteristics that have attributes for magnitude, duration, frequency or pulse, or other electrical characteristics.

In an example of FIG. 3, the control system 300 includes perception logic 318, localization component 320, and traction determination component 350. The perception logic 318 includes processes to analyze the sensor data 311 in order to enable the control system 300 to understand its environment, including, for example, information about the road surface, objects on the roadway, and objects near the roadway (e.g., moving objects which may end up on the roadway).

The localization component 320 can utilize sensor data 311 and/or GPS data (not shown) to generate localization output 321. The localization output 321 can correspond to, for example, a position of the vehicle within a road segment. The localization output 321 can be specific in terms of identifying, for example, any one or more of a driving lane that the vehicle 10 is using, the vehicle's distance from an edge of the road, the vehicle's distance from the edge of the driving lane, and/or a distance of travel from a point of reference for the particular submap. In some examples, the localization output 321 can determine the relative location of the vehicle 10 within a road segment, as represented by a submap, to within less than a foot, or to less than a half foot.

In an example of FIG. 3, the control system 300 may include a traction determination component 350 to determine traction information 315 for the vehicle 10. The traction determination component 350 may be implemented as shown by traction determination system 100, as well as other examples of FIG. 1. In variations, the traction determination component 350 may be implemented as either a discrete or distributed component.

The traction determination component 350 may generate traction information 315 (see FIG. 1) in association with locations where the sensor information was obtained. The traction information 315 may be communicated to the network service 200 via the wireless communication component 354. Additionally, the traction information 315 may be determined and/or received on the vehicle 10 as part of a geographic data structure (e.g., see traction map 144 of FIG. 1). In an example of FIG. 3, the control system 300 may utilize a data map component 340 to maintain a road information map 344, which incorporates various data layers for enabling autonomous driving. The data map component 340 may receive traction information 315 from the traction determination component 350. The data map component 340 may also receive updates to the road information map 344 from the network service 200.

In some examples, the data map component 340 receives and stores traction information 315 from the network service 200 continuously (e.g., as the vehicle is operating) or asynchronously (e.g., when the vehicle is idle or off). As an addition or variation, the data map component 340 may also communicate traction information 315 determined on the vehicle 10, along with other road network information, to the network service 200. For example, as the vehicle 10 operates, some examples provide for the control system 100 to communicate traction information 315 to a remote source, so that the traction information which the vehicle 10 just determined can be processed (e.g., aggregated) for use with other vehicles. In this regard, the vehicle 10 can operate as an information source for a network service that maintains road network information for multiple vehicles (e.g., a fleet of vehicles).

In some variations, road information map 344 may be structured as part of a series of submaps, which identify a road network in discrete portions. Submaps can be aligned and versioned, which can be aligned and versioned, so that vehicle 10 can update each submap independently of other submaps. A network service may provide the submaps to the vehicle, and the submaps may include versioning to enable the network service to identify vehicles in need of updates, and to ensure compatibility when submap updates are communicated to vehicles. In the context of submaps, traction information 315 can be provided as a data layer which can be updated independent of other data layers, representing other aspects of the road network and the surrounding environment. Other examples of data layers which may be maintained and updated through submaps include landmarks (e.g., perception layer data) and signage and traffic lights.

In some examples, the traction determination component 350 provides an expectation of traction for a road segment on which the vehicle is to travel over. The traction determination component 350 may, for example, use image data from a LiDar or cameras to approximate an expectation of traction values in an upcoming road segment which the vehicle may pass over within seconds. In some variations, the control system 300 may also determine an immediate expectation of traction from the road information map 344. The control system 300 may use the expected traction value to perform operations, such as planning and/or implementing a trajectory of the vehicle 10 via the motion planning component.

The perception logic 318 can process sensor data 311 to detect perceptions 323, which may include objects and/or information about the road surface. Objects which are identified through the perception logic 318 can be perceived as being static or dynamic, with static objects referring to objects which are persistent or permanent in the particular geographic region. As described with some examples below, the presence of static objects (e.g., landmarks) may be stored and/or made available to the control system 300 from the network service 200. For example, road network information 313 may be received from the network service 200 which includes identification of static objects. The perception logic 318 may access the static objects to generate perceptions 323 that are based on sensor data 311 which exclude predetermined static objects. The perception logic 318 can generate perceptions 323, which can include (i) image, sonar or other electronic sensory-based renderings of the environment, (ii) detection and classification of dynamic objects in the environment, and/or (iii) state information associated with individual objects (e.g., whether object is moving, pose of object, direction of object). In some examples the perception logic 318 can be centralized, such as residing with a processor or combination of processors in a central portion of the vehicle. In other examples, the perception logic 318 can be distributed, such as onto the one or more of the sensor interfaces 310, 312, 314, such that the outputted sensor data 311 can include perceptions.

The localization output 321, the perceptions 323 and expected traction information 315 are communicated to motion planning component 324. The motion planning component 324 determines trajectories 325 of the vehicle 10 as the vehicle travels on a road segment. The trajectories 325 can identify each of an actual (immediate) or planned path based on the current and planned locations of the vehicles. The perceptions 323 may also identify dynamic objects which have potential to collide with the vehicle, and the trajectories 325 may account for the presence of such objects. The trajectories 325 may also take into account the expected traction values of the planned trajectory. In this regard, the planned trajectory may also account for a velocity profile (maximum and/or minimum velocity) and/or acceleration profile (maximum and/or minimum acceleration) for the vehicle when traveling the planned trajectory 325. The trajectories 325 can reflect an immediate path forward for the vehicle (e.g., for the next 5 seconds). In variations, the trajectories 325 can implement alternative or contingent trajectories, which may be initiated within a given duration of time (e.g., 5 seconds) when needed. The perceptions 323 can provide input into the motion planning component 324. The motion planning component 324 includes logic to separate dynamic objects of the vehicle's environment from static objects. When dynamic objects are detected, the motion planning component 324 may utilize the location output 321 and the road network information 313 to determine one or more alternative (or safe trajectories) and/or actual trajectory 325 to avoid the dynamic object or other hazard. The motion planning component 324 may also implement velocity and acceleration profiles as part of planned or actual trajectories based in part on the expected traction values.

The route planner 322 can determine a route 329 for a vehicle to use on a trip. In determining the route 329, the route planner 322 can utilize a map database, such as provided over a network through a map service. Based on input such as destination and current location (e.g., such as provided through GPS), the route planner 322 can select one or more route segments that collectively form a path of travel for the autonomous vehicle 10 when the vehicle in on a trip. In one implementation, the route planner 322 can determine route input 373 (e.g., route segments) for a planned route 329, which in turn can be communicated to the vehicle control 328.

The vehicle control interface 328 can include a route following component 367 and a trajectory following component 369. The route following component 367 can receive route input 373 from the route planner 322. Based at least in part on the route input 373, the route following component 367 can output trajectory components 375 for the route 329 to the vehicle control interface 328. The trajectory follower 369 can receive the trajectory components 375 of the route follower 367, as well as the response trajectory 325, in controlling the vehicle on a vehicle trajectory 379 of route 329. At the same time, the response trajectory 325 enables the vehicle 10 to make adjustments to predictions of the predictive engine 126. The vehicle control interface 328 can generate commands 85 as output to control components of the vehicle 10. The commands can further implement driving rules and actions based on various context and inputs.

According to some examples, the localization output 321 can be utilized by, for example, the prediction engine 326, and/or vehicle control 328, for purpose of detecting potential points of interference or collision on the portion of the road segment in front of the vehicle. The localization output 321 can also be used to determine whether detected objects can collide or interfere with the vehicle 10, and response actions that are determined for anticipated or detected events. Either of the route following component 367 and trajectory following component 369 can also use the localization output 321 to make precise determinations for routes and trajectories.

With respect to an example of FIG. 3, the vehicle control interface 328 implements event logic 374 to detect avoidance events (e.g., a collision event) and to trigger a response to a detected event. An avoidance event can correspond to a roadway condition or obstacle which poses a potential threat of collision to the vehicle 10. By way of example, an avoidance event can include an object in the road segment, heavy traffic in front of the vehicle, and/or wetness or other environmental conditions on the road segment. The event logic 374 can use perceptions 323 as generated from the perception logic 318 in order to detect events, such as the sudden presence of objects or road conditions which may collide with the vehicle 10. For example, the event logic 374 can detect potholes, debris, and even objects which are on a trajectory for collision. Thus, the event logic 374 detects events which, if perceived correctly, may in fact require some form of evasive action or planning. The event logic 374 may also receive expected traction information for the road segment, in order to establish, for example, a velocity and/or acceleration profile for the evasive action.

When events are detected, the event logic 374 can signal an event alert 335 that classifies the event and indicates the type of avoidance action which should be performed. For example, an event can be scored or classified between a range of likely harmless (e.g., small debris in roadway) to very harmful (e.g., vehicle crash may be imminent). In turn, the route follower 367 can adjust the vehicle trajectory 379 of the vehicle to avoid or accommodate the event. For example, the route follower 367 can output an event avoidance action 337, corresponding to a trajectory altering action that the vehicle 10 should perform to effect a movement or maneuvering of the vehicle 10. By way of example, the vehicle response can include a slight or sharp vehicle maneuvering for avoidance, using a steering control mechanism and/or braking component. The event avoidance action 337 can be signaled through the commands 85 for controllers 84 of the vehicle interface subsystem 90.

When an anticipated dynamic object of a particular class does in fact move into position of likely collision or interference, some examples provide that event logic 374 can signal the event alert 335 to cause the vehicle control 328 to generate commands 85 that correspond to the event avoidance action 337. For example, in the event of a bicycle crash in which the bicycle (or bicyclist) falls into the path of the vehicle 10, event logic 374 can signal the event alert 335 to avoid the collision. The event alert 335 can indicate (i) a classification of the event (e.g., "serious" and/or "immediate"), (ii) information about the event, such as the type of object that generated the event alert 335, and/or information indicating a type of action the vehicle 10 should take (e.g., location of object relative to path of vehicle, size or type of object).

The road information map 344 can include sensor readings or sensor-based determinations of roadway conditions (e.g., accumulated precipitation, road hazards, traffic, etc.), as well as traction information 315 determined the traction determination component 350. The traction information 315 may be location specific, and the traction determination component 350 may maintain the traction information 315 in association with specific locations of the road network. Depending on implementation, various levels of granularity may be used in linking a road surface location with corresponding information of the road information map 344. In one implementation, the traction determination component 350, or other logical component of the control system 300, uses a localization output 321 of the localization component 320 to synchronize the traction information 315 with the location of the vehicle 10 where the traction information 315 was captured. In this way, the road information map 344 stores traction information 315 in association with a location where the traction information was determined.

In one implementation, the control system 300 may include logic to calibrate time stamps communicated with sensor data 311 from different sensor sources, in order to identify a relative instance in time when sensor data 311 was measured on the vehicle 10. The instance in time may be determined in order to synchronize the sensor data 311 with the localization output 321 that coincides with when the sensor information 311 was captured. connection with the determination of the traction information 315 and the localization output 321. With respect to the traction determination component 350, the synchronization allows the traction information 315 to be associated with a highly granular location of a road surface. For example, the traction information 315 may be determined for a location of a road surface that is of the order of a width of a tire segment.

In some examples, the control system 300 may also determine traction information, as determined by the vehicle passing over the region of the road segment, to validate and/or correct the expected traction value. The control system 300 may, for example, detect deviation of the actual traction value (measured from sensors as the vehicle passes over the region of the road surface) from the expected traction value provided from image sensors in order to calibrate the sensors and/or tune the correlation models. Still further, the control system 300 may, for example, detect deviation of the actual traction value (measured from sensors as the vehicle passes over the region of the road surface) from the expected traction value provided from the road information map 344, and then communicate the deviation to, for example, the service 200. In turn, the network service 200 may communicate a traction map update to other vehicles which may operate in the same geographic region.

When an expectation of low traction is determined or received (e.g., ice patch or puddle) for an upcoming region of the road segment, the motion planning component 324 can alter its trajectory to (i) avoid the low traction region (e.g., swerve around it, change lanes, position middle of vehicle to pass over region), and (ii) implement driving operations in accordance with a velocity or acceleration profile that is reduced and safer, given the expected traction value. In variations, the motion planning component 324 can plan alternative contingent trajectories to avoid, for example, dynamic objects which may continue on a path of collision with the vehicle. In such variations, the motion planning component 324 may plan the contingent trajectories to account for the expected low traction regions. For example, the contingent trajectories may be selected in consideration of the low traction region, and/or be implemented with velocity/acceleration profiles that account for the low traction region.

In some examples, the route planner 322 can also use traction information 315 provided with the road information map 344 to select segments of routes. For example, the route planner 322 may consider traction information 315 associated with a default, preferred or planned route segment of a vehicle's trip, in view of traction information 315 associated with alternative routes. The route planner 322 may select the route of the vehicle based on, for example, a trip time or distance, and a safety margin, where the safety margin is based at least in part on the traction values of road segments of the route. If the route segments are within a safety margin, then the route planner 322 may select the route segments based on preference and/or reduction of trip time or distance. If the route segments are not within the safety margin, an alternative route may be selected which could meet the desired safety margin, provided that the alternative route is within a threshold in time or distance.

In other variations, the route planner 322 may select the vehicle's route based on an optimization of trip time or distance, as well as the safety margin between the primary and alternative routes. Still further, in some examples in which a trip has not started (e.g., when transport request is made through a transport arrangement service), the route planner 322 may select the vehicle 10 based on the traction capabilities of the vehicle (e.g., type of tires, vehicle elevation, etc.).

Hardware Diagrams

Figure 4:
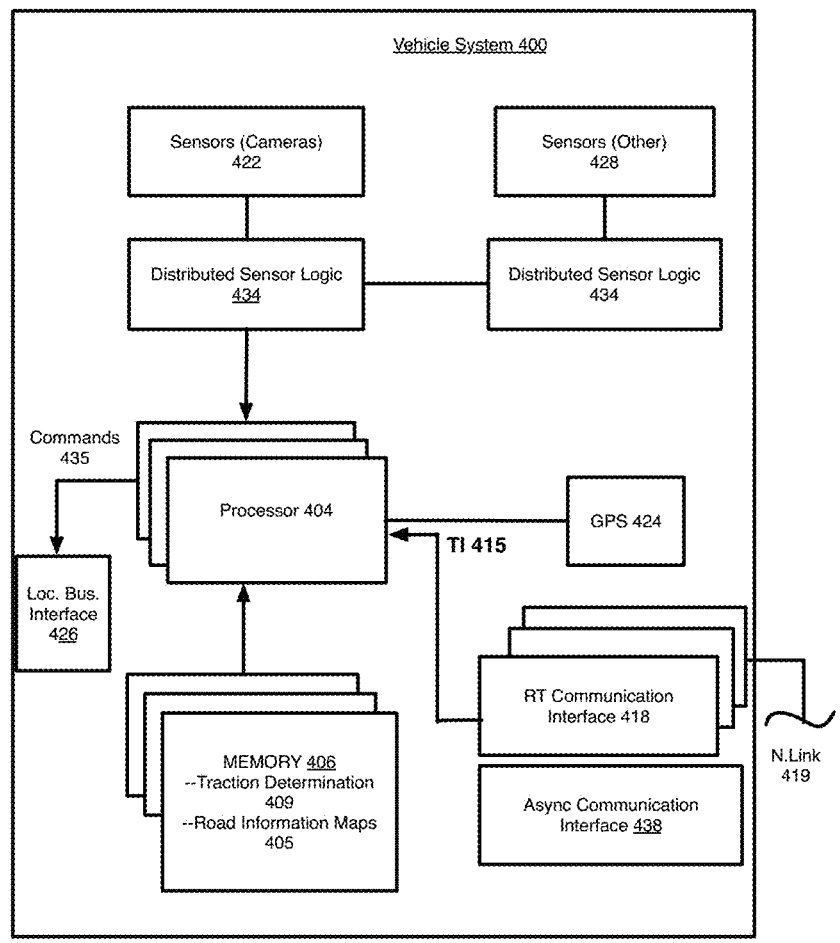
FIG. 4 is a block diagram of an autonomous vehicle system on which a traction determination system can be implemented.

FIG. 4 is a block diagram of an autonomous vehicle system on which a traction determination system can be implemented. According to some examples, a vehicle system 400 can be equipped with a set of processors 404, memory resources 406, multiple sensors interfaces 422, 428 (or interfaces for sensors) and location-aware hardware such as shown by GPS 424. In an example shown, the vehicle system 400 can be distributed spatially into various regions of a vehicle. For example, a processor bank 404 with accompanying memory resources 406 can be provided in a vehicle trunk. The various processing resources of the vehicle system 400 can also include distributed sensor processing components 434, which can be implemented using microprocessors or integrated circuits. In some examples, the distributed sensor logic 434 can be implemented using field-programmable gate arrays (FPGA).

In an example of FIG. 4, the vehicle system 400 further includes multiple communication interfaces, including a real-time communication interface 418 and an asynchronous communication interface 438. The various communication interfaces 418, 438 can send and receive communications to other vehicles, central services, human assistance operators, or other remote entities for a variety of purposes. In the context of examples of FIG. 1, for example, the vehicle may receive instructions to implement the traction determination system 100 using, for example either of the communication interfaces 418, 438. When the vehicle 10 is on trip, the vehicle may exchange traction information 415 about a road network (and/or portions of a traction map 144) with the automobile network service 200 (see FIG. 2) using, for example, the real-time communication interface 418.

The vehicle system 400 can also include a local communication interface 426 (or series of local links) to vehicle interfaces and other resources of the vehicle 10. In one implementation, the local communication interface 426 provides a data bus or other local link to electro-mechanical interfaces of the vehicle, such as used to operate steering, acceleration and braking, as well as to data resources of the vehicle (e.g., vehicle processor, OBD memory, etc.). The local communication interface 426 may be used to signal commands 435 to electro-mechanical interfaces for controlling operation of the vehicle.

The memory resources 406 can include, for example, memory resources, a read-only memory (ROM), storage device, and cache resources. The memory resources 406 can also include random access memory (RAM) or other dynamic storage device, for storing information and instructions which are executable by the processors 404.

The processors 404 can execute instructions for processing information stored with the main memory 406. The memory resources 406 can also store temporary variables or other intermediate information which can be used during execution of instructions by one or more of the processors 404. The memory resources 406 can also include ROM or other static storage device for storing static information and instructions for one or more of the processors 404. The memory resources 406 can also include other forms of memory devices and components, such as a magnetic disk or optical disk, for purpose of storing information and instructions for use by one or more of the processors 404.

One or more of the communication interfaces 418 can enable the autonomous vehicle to communicate with one or more networks (e.g., cellular network) through use of a network link 419, which can be wireless or wired. The vehicle system 400 can establish and use multiple network links 419 at the same time. Using the network link 419, the vehicle system 400 can communicate with one or more remote entities, such as network services or human operators. According to some examples, the vehicle system 400 stores in memory resources 406 road information maps 405, which may include traction information 415 for individual locations of a road network. The memory resources 406 may also store traction determination instructions 409 to implement, for example, the traction determination system of FIG. 1. The memory resources 406 may also store autonomous vehicle ("AV") control system instructions 425 for implementing the control system 300, including the traction determination component 350.

In operating the autonomous vehicle 10, the one or more processors 404 can execute AV control system instructions 425 to operate the vehicle. Among other control operations, the one or more processors 404 may access data from road information maps 405 in order to plan driving operations to accommodate expected traction conditions. The one or more processors 404 may also determine a route, immediate path forward, and/or information about a road segment that is to be traversed by the vehicle. The road network can be stored in the memory 406 of the vehicle and/or received responsively from an external source using one of the communication interfaces 418, 438. For example, the memory 406 can store a database of roadway information for future use, and the asynchronous communication interface 438 can repeatedly receive data to update the database (e.g., after another vehicle does a run through a road segment).

Figure 5:
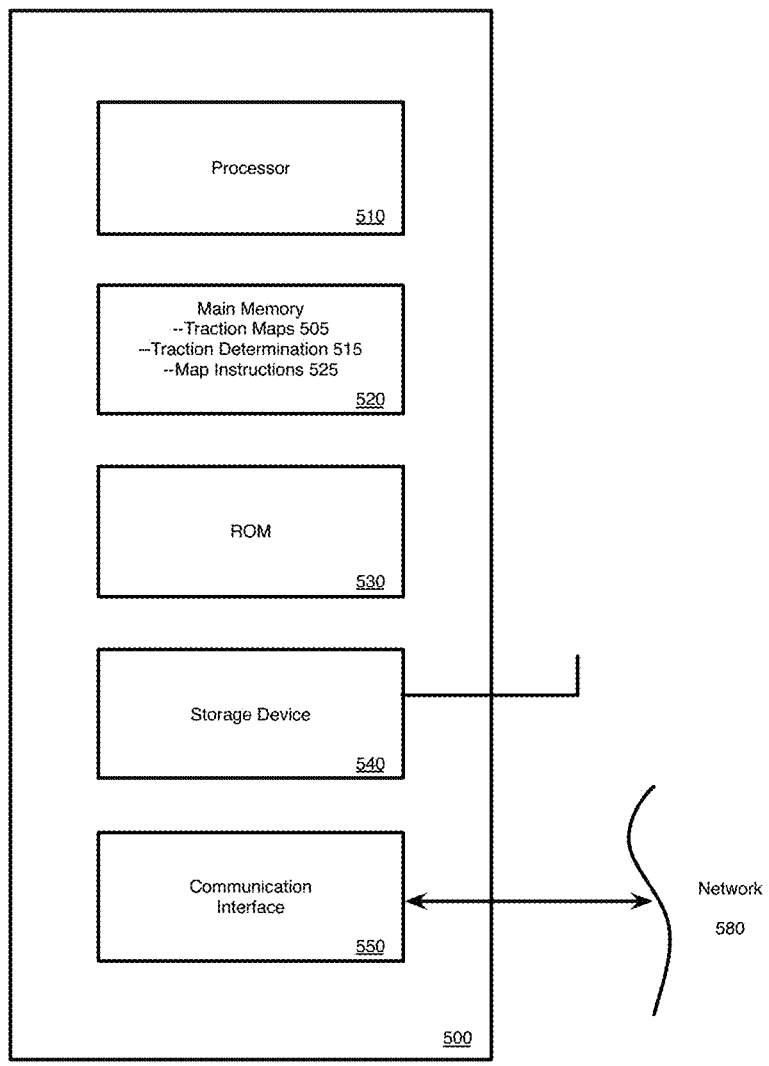
FIG. 5 is a block diagram of a network service or computer system on which some embodiments may be implemented.

FIG. 5 is a block diagram of a network service or computer system on which some embodiments may be implemented. According to some examples, a computer system 500 may be used to implement an autonomous vehicle service 200, such as shown with an example of FIG. 2.

In one implementation, the computer system 500 includes processing resources, such as one or more processors 510, a main memory 520, a read-only memory (ROM) 530, a storage device 540, and a communication interface 550. The computer system 500 includes at least one processor 510 for processing information and the main memory 520, such as a random access memory (RAM) or other dynamic storage device, for storing information and instructions to be executed by the processor 510. The main memory 520 also may be used for storing temporary variables or other intermediate information during execution of instructions to be executed by the processor 510. The computer system 500 may also include the ROM 530 or other static storage device for storing static information and instructions for the processor 510. The storage device 540, such as a magnetic disk or optical disk, is provided for storing information and instructions. For example, the main memory 520, ROM and/or storage device 540 can correspond to an example of a computer-readable medium that stores traction determination instructions 515 for determining traction information for a fleet of autonomous vehicles. In such examples, the computer system 500 can store a library of traction maps 505 (or road information maps) for a geographic region, with each traction map being structured in accordance with one or more examples described below. The memory 520 may also store instructions for managing and distributing traction or road information maps ("map instructions 525").

The communication interface 550 can enable the computer system 500 to communicate with one or more networks 580 (e.g., cellular network) through use of the network link (wirelessly or using a wire). Using the network link, the computer system 500 can communicate with a plurality of user vehicles, using, for example, wireless network interfaces which may be resident on the individual vehicles.

Some of the examples described herein are related to the use of the computer system 500 for implementing the techniques described herein. According to one example, those techniques are performed by the computer system 500 in response to the processor 510 executing one or more sequences of one or more instructions contained in the main memory 520. Such instructions may be read into the main memory 520 from another machine-readable medium, such as the storage device 510. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

Methodology

Figure 6:
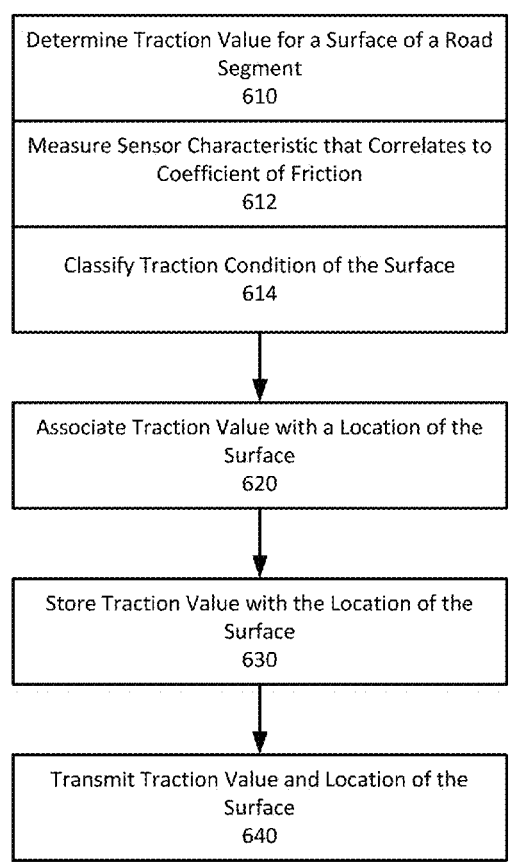
FIG. 6 illustrates an example method for to implement traction determination on an autonomous vehicle that operates on a trip.
Figure 7:
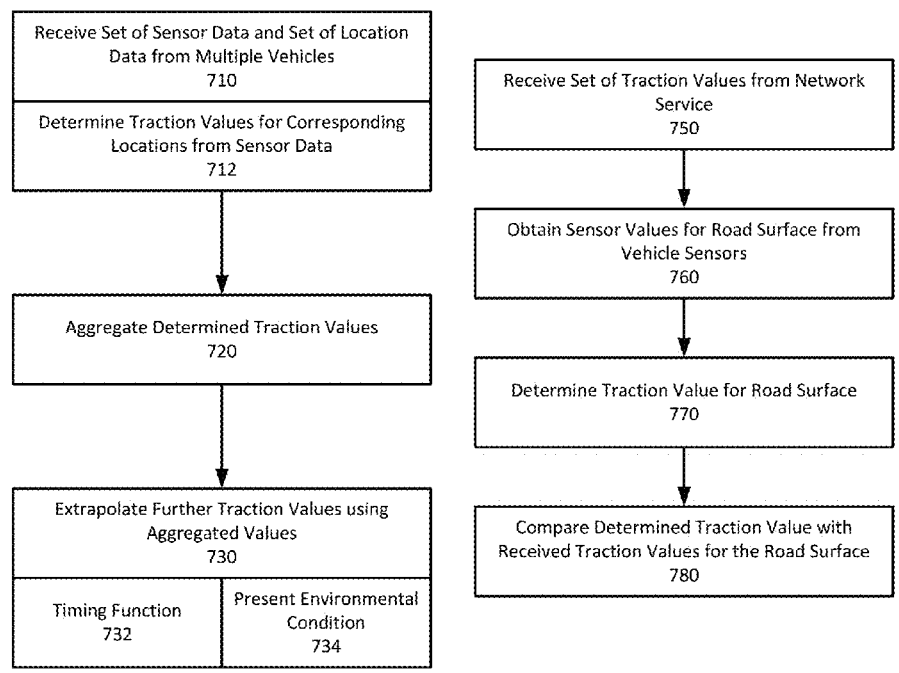
FIG. 7A illustrates an example method for operating a network service to maintain a traction map for a fleet of vehicles.
FIG. 7B illustrates an example method for operating a vehicle to receive traction information from a network service.
Figure 8:
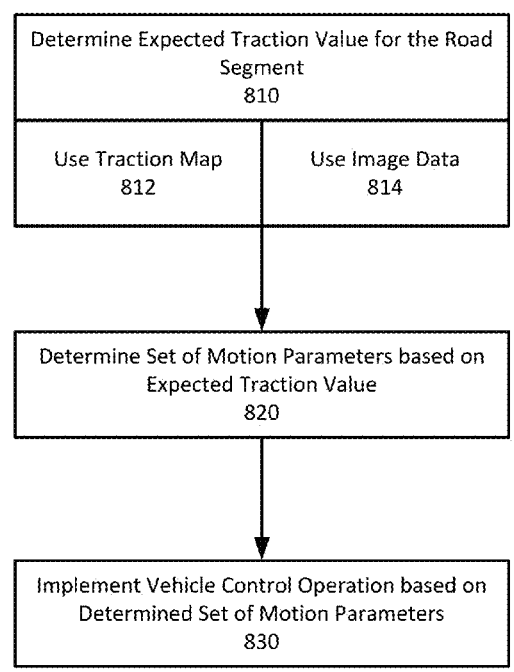
FIG. 8 illustrates an example method for operating a vehicle to plan a trajectory based on an expected traction value of the road segment on which the vehicle travels.
Figure 9:
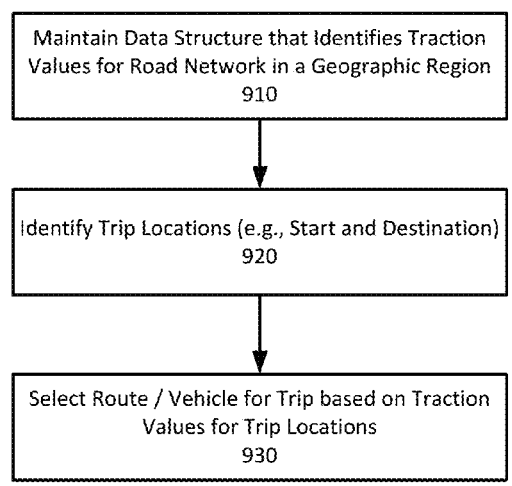
FIG. 9 illustrates an example method for providing transport for a trip.
Figure 10:
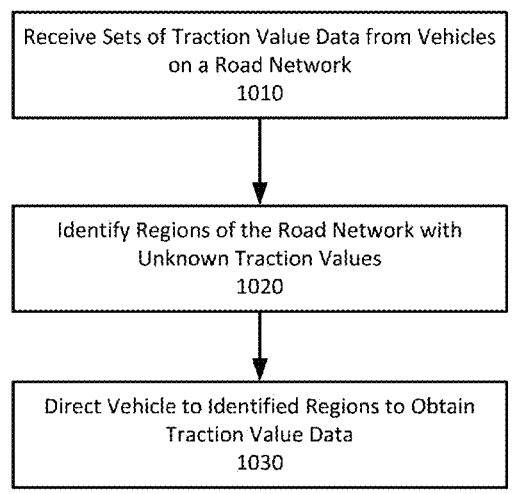
FIG. 10 illustrates an example method for determining traction information for locations of a geographic region.
Figure 11:
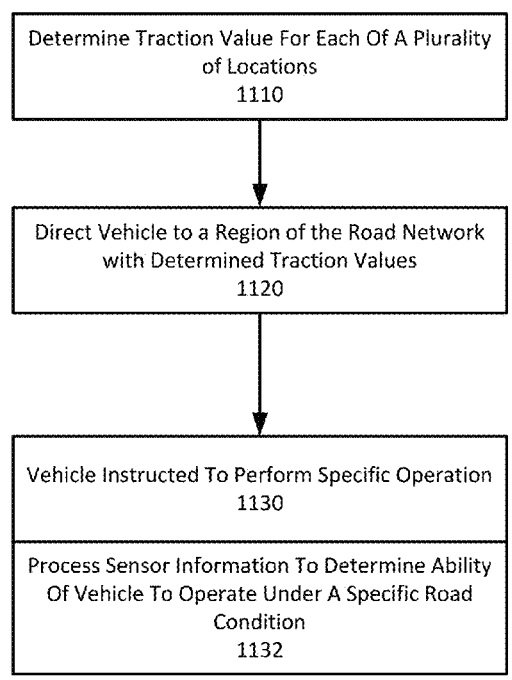
FIG. 11 illustrates an example method for determining a capability of a vehicle to operate over a road surface which includes low traction regions.
Figure 12:
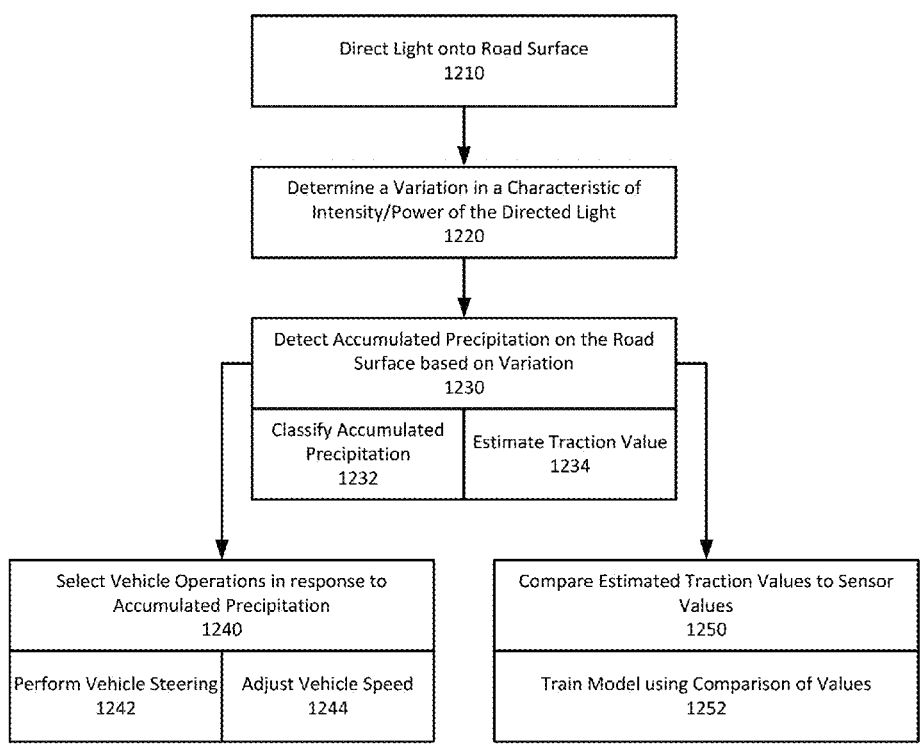
FIG. 12 illustrates an example method for determining an expected traction value for an upcoming road segment.

FIG. 6 illustrates an example method for operating a vehicle to determine traction information of a road surface. FIG. 7A illustrates an example method for operating a network service to maintain a traction map for a fleet of vehicles. FIG. 7B illustrates an example method for operating a vehicle to receive traction information from a network service. FIG. 8 illustrates an example method for operating a vehicle to plan a trajectory based on an expected traction value of the road segment on which the vehicle travels. FIG. 9 illustrates an example method for providing transport for a trip. FIG. 10 illustrates an example method for determining traction information for locations of a geographic region. FIG. 11 illustrates an example method for determining a capability of a vehicle to operate over a road surface which includes low traction regions. FIG. 12 illustrates an example method for determining an expected traction value for an upcoming road segment. Examples such as described with FIG. 6 through FIG. 12 may be implemented on at least one of an autonomous vehicle, such as described with an example of FIG. 3 and FIG. 4, or a network service for use with an autonomous vehicle, such as described with an example of FIG. 2 and FIG. 5. Accordingly, reference may be made to elements of prior examples for purpose of illustrating a suitable component or element for performing a step or sub-step that is being described.

With reference to an example of FIG. 6, an autonomous vehicle operates to determine a traction value for a surface of a road segment (610). In particular, some examples provide for the autonomous vehicle to determine a traction value through a correlation of a detected sensor characteristic (e.g., grip, variation in intensity and power or reflection) and the coefficient of friction which the vehicle experiences when traveling on the roadway (612). The correlation may be determined through, for example, development of correlation models. In examples in which brake sensors or tire sensors are used to determine the traction value, the models may be developed through, for example, supervised training of a correlation model, using laboratory road surfaces that simulate a given road network under alternative road conditions. In examples in which image data is used to determine traction, some examples provide for the vehicles to verify the image-based determination using alternative sensors, such as provided with tire sensors or brake sensors.

The control system 300 of the vehicle may classify the traction condition of the surface of the road based at least in part on the traction value (614). In some examples, the classification may be binary or trinary, such as classifications which correlate to adequate traction, marginal traction, and inadequate traction. In variations, the classification can be more granular, and even link to a type of environmental condition, such as accumulated rain, snow, sleet, or ice.

The control system may associate the traction value with a location on the surface of the road (620). In some examples, the vehicle 10 may use a GPS component to determine the location of the vehicle. In variations, the vehicle 10 may use other location determination resources, such as the localization component 320. A determined traction value, as measured on the vehicle traveling over a given region or location of the road network, may be synchronized with the location where the traction value was experienced by the vehicle.

According to some examples, the control system 300 stores determined traction values of the vehicle passing over a road segment, in association with the location of the vehicle where the traction value was experienced (630). In some examples, the traction value and location may be stored in a geographic data structure, such as a map or submap which includes the road segments the vehicle is traveling on during a trip.

The control system 300 may transmit traction values paired with their respective locations to the network service 200 (640). In some examples, the control system may transmit portions of the traction map 344 which the vehicle determines while on trip. In variations, the control system 300 may also communicate with the network service 200 to receive traction maps (e.g., traction values measured by other vehicles), which provide traction values the vehicle may not have previously had for certain road segments. The network service 200 may also transmit traction map updates, which update traction values for locations of the road segment which the vehicle's current traction map covers. Thus, for example, the network service 200 may aggregate traction values from other vehicles and provide updates due to passage of time and/or change in environmental conditions.

With respect to an example of FIG. 7A, the network service 200 receives sets of sensor data and location data from multiple autonomous vehicles which operate on a road network of a given geographic region (710). In some examples, the control system 300 of the vehicle determines the traction values on the vehicle, and further associates the traction values with locations of the road segment where the vehicle experiences the traction value (712). In such implementation, the vehicle 10 communicates traction values and associated locations to the network service 200.

In some variations, the vehicles communicate sensor data to the network service for determination of traction values. The sensor data communicated from the autonomous vehicle may be synchronized with locations where the sensor data was captured.

The network service 200 can operate to aggregate traction values transmitted from multiple vehicles for numerous locations of a given geographic region (720). For high frequency locations, the network service 200 may receive multiple traction values from different vehicles, and the aggregation of the traction values can provide a weighted or running average for a set duration of time. Some vehicles may communicate traction values for lesser frequented road segments. The network service 200 can aggregate the traction information to obtain breadth of actual measured traction values for the road network, with more frequented locations providing more reliable data that accounts for multiple traction measurements in a given time frame.

In some examples, the network service 200 can implement extrapolation processes in order to obtain an estimation of approximation of the traction value for the lesser traveled road segments (730). In some examples, the extrapolation may be spatial, meaning traction values of nearby locations which are known (such as with a high degree of confidence) are used to estimate traction values of locations with lesser confidence (such as because the locations of lesser confidence are less traveled). The basis for the spatial extrapolation may be that locations which are in proximity to one another on a road segment likely undergo the same road conditions (e.g., weather).

As an addition or variation, traction values for some locations may be approximated from the known traction value of the location at a prior time (e.g., earlier in the day) (732). For example, when the known location has undergone precipitation, a timing function or model may be used to approximate the change to the traction value based on the change in the precipitation. For example, the network service 200 may implement a timing function in order to model a wet road as becoming icy based on factors such as temperature, the time of day, the presence of shade on the road at that location, or wind.

In other examples, the network service 200 may approximate the traction value of a lesser traveled location on the road network based on known contextual and environmental parameters about the location (734). For example, the location may be characterized by type of surface, slope, and/or presence of shading. The network service 200 may receive input that identifies an environmental condition (e.g., rain or snowfall), and then implements a transformation function to transform the most reliable traction value for the location to an estimated value based on the contextual and environmental parameters.

With reference to an example of FIG. 7B, the vehicle 10 may receive traction values from the network service 200 (750). For example, the vehicle may receive the traction map 244 or traction map update 246 from the network service

200. In some examples, the traction values may be stored as part of a traction map, on the vehicle 10, while the vehicle is being operated.

While the vehicle 10 is being operated, the vehicle may also obtain sensor values which can form a basis for determining traction values (760). For example, the vehicle 10 may receive tire sensor data, brake data (e.g., ABS sensor data which may be correlative to friction coefficient of the road), and image data. The control system 300 determines the traction of a given road location using the sensor data of the vehicle (770). For example, the control system 300 may use the traction determination component 350 to determine the traction values of the road based on tire sensor data and/or braking sensor data.

The control system 300 may compare, for individual locations, the determined traction value against the received traction value (780). When the comparison results in a difference that exceeds a threshold, some examples provide that the control system 300 communicates the vehicle's measured traction value back to the network service 200.

With reference to an example of FIG. 8, the control system 300 of the vehicle 10 operates to determine an expected traction value for a region of a road segment on which the vehicle is approaching during a trip (810). In one implementation, the expected traction value is determined by receiving a traction map (or portions thereof) from the network service 200 (812). As an addition or alternative, the expected traction value is determined using image data (814), such as through use of traction determination logic 120 implementing active image logic 114 or passive image logic 116.

Based on the expected traction value, the control system 300 determines a set of motion parameters (820). The set of motion parameters can affect the vehicle's immediate, upcoming, or contingent or planned trajectory. This may include, for example, which lane on a road the vehicle 10 travels on, or the position the vehicle takes in-lane on the road segment. The motion parameters may also include parameters of a permitted velocity or acceleration profile (including forward acceleration, braking or steering). The velocity or acceleration profile can set, for example, a maximum or minimum value for an acceleration or velocity profile.

A vehicle control operation may be implemented based on the determined motion parameters (830). When the vehicle is on trip, the vehicle operations can be gradual or constant with the current motion. As an addition or variation, the vehicle operations may be set to maintain operation of the vehicle within maximum ranges of forward acceleration, velocity, braking, or steering.

With respect to an example of FIG. 9, a traction data structure can be maintained for a given geographic region (910). The traction data structure (e.g., traction map) may identify a traction value for each location in a plurality of locations of a road network within the geographic region. In some examples, the network service 200 aggregates the traction values for a geographic region based on the operation of vehicles within the geographic region. The network service 200 may, for example, be implemented as part of a transport arrangement service which plans trips for transport requests.

For a given trip, the network service 200 may identify at least one of a start or destination location for a trip (920). For example, a transport request from a user may specify a trip start and trip end location. As between the start and destination location, the network service 200 can identify multiple candidate routes from which a route selection may be made. The route selection, by default, may select the candidate route based on parameters such as trip time or trip distance.

When inclement weather is present, for example, the network service 200 can also plan the trip based on the traction values of one or more of the plurality of locations. In particular, the network service 200 may be planned by selecting at least one of a route or a vehicle to use for a given trip request (930). By way of example, the network service 200 may select the vehicle, and base the selection of a route between the trip start and trip end, to avoid road segments which, for example, include traction values that are below a safe threshold. In variations, the network service 200 selects the vehicle based on a traction capability of the vehicle. For example, if the traction values are below a threshold amount at a given location, the network service 200 may select a vehicle with added or more suitable components for handling the low traction regions.

With respect to an example of FIG. 10, the network service 200 may receive sets of data from multiple vehicles which operate on a road network of a geographic region (1010). In some examples, the received data corresponds to traction values which are associated with location of the road segment where the traction value is applicable to. In variations, the received data may correspond to sensor data, which the network service 200 can use to calculate traction values for specific or discrete locations of the road network. The network service 200 may build a geographic data structure (e.g., traction map) in which discrete locations of a road network are provided traction values which are determined directly from sensor values of vehicles which travel over those locations.

The network service 200 may identify regions of the road network for which the traction value is unknown (1020). In some variations, the unknown traction values may include traction values which are unreliable, such as traction values which were determined beyond a threshold duration of time.

The network service can then direct the vehicle to operate over the region of the road network, in order to obtain additional data that is indicative of a current traction value of the location of the road segment (1030). In some examples, a vehicle is selected to pass over the region based on a vehicle occupancy state. For example, in the context of a transport arrangement service, an autonomous vehicle may be selected to pass over the identified road segment and determine the traction value after the vehicle drops off its passenger. In variations, the selection of the vehicle to pass over the road segment may be made to minimize, for example, a distance traveled by a given vehicle of the fleet to reach the road segment.

Still further, the selection of the vehicle may be made based on a capability of the vehicle with respect to handling, for example, low traction conditions. For example, if the traction determination for a road segment is warranted because of fresh snowfall, the vehicle selected may have sufficient clearance to not be affected by accumulated snow.

In FIG. 11, a traction value is determined for each of a plurality of regions of the road network (1110). The traction values may be associated with locations of the road network where the traction value was detected or experienced. The network service 200 may, for example, maintain a traction map reflecting recent traction determinations made by a fleet of vehicles. The network service 200 may identifying a region of the road network for which the traction value is known. The traction value may be known when a confidence associated with the traction value is above a threshold. For example, for a given location in which multiple vehicles made recent traction measurements, the confidence of the traction value may be high, and thus known. If however, the traction value is not updated within a threshold duration of time, the confidence associated with the traction value may fall below the threshold, and the traction value for the region of the road segment may be unknown. Likewise, if the traction value returned by multiple vehicles are not equal, the confidence of the traction value may become less or even unknown.

In some examples, when the traction value of a given location is known, the network service 200 may direct a vehicle to operate over that region of the road network (1120). The vehicle may operate over the particular region in order to obtain sensor data that is indicative of a traction capability of the vehicle. According to some examples, the traction capability of the vehicle may be indicated by comparing a traction value, as determined from the sensor data, to the known traction value. The determination of the traction capability of the vehicle may include a determination that the vehicle either has insufficient or sufficient traction capability. A determination that the vehicle has insufficient traction capability may also include a determination of a severity of the vehicle's incapability. For example, the vehicle may be deemed unsafe for a particular weather event in which the traction of the road segment falls below a threshold level.

In some examples, the network service 200 may operate to instruct the vehicle to perform a specific type of operation (1130). In particular, the network service 200 may instruct the vehicle to perform a traction experiment, where the vehicle 10 is accelerated or decelerated beyond what is required to control the vehicle in order to establish how much additional control margin is available to the vehicle. By way of example, as the vehicle performs the operation (e.g., acceleration or deceleration beyond what is required), the control system 300 obtains sensor information for the vehicle 10. The sensor information can be processed to determine, for example, a capability of the vehicle 10 to operate under a given road condition (e.g., low friction) (1132). In some examples, the sensor information determined for the vehicle may be used to determine a category of the insufficiency of the vehicle operation. By way of example, the vehicle may be instructed to perform an S-swerve over a road segment where rain or ice has formed, to test the fringe case performance of the brakes and tires on the vehicle. Likewise, the vehicle can be instructed to perform a sudden stop or a sudden acceleration on a wet road. Sensor measurements may be made for the vehicle to test, for example, (i) whether the vehicle slid, (ii) the turning radius of the vehicle, and/or (iii) the stopping distance of the vehicle. The measurements may be compared to other vehicles. If the vehicle's response is deficient to the loss of traction, the network service 200, and/or the vehicle 10 may categorize the deficiency (e.g., poor steering or tires).

With reference to FIG. 12, the vehicle 10 operates to direct light onto a region of a road surface on which the vehicle is moving (1210). The light may correspond to, for example, a laser or set of lasers, such as generated by a LiDar. In conventional approaches, LiDar is used to detect objects which surround the vehicle. The detection of objects processes the returned LiDar signal for elevation. In an example of FIG. 12, the LiDar return signal may still be used to process for elevation. However, the data set that is captured by the LiDar can also be accessed for raw power and raw intensity. Thus, the LiDar may be accessed for alternative returned data sets (e.g., elevation data set to detect objects, raw power and/or intensity for road surface).

The control system 300 may capture a reflection pattern of the returned signal. The control system 300 may determine a variation in an intensity or power of the returned reflection from the ground surface (1220).

The variation in the intensity or power of the return signal may be processed and correlated to accumulated precipitation (1230). The accumulated precipitation may be classified by type (e.g., light rain, heavy rain, snow, sleet, ice, etc.) (1232). In some examples, a traction value may be associated with each type of road conditions, such that the traction value may be estimated with detection of the type of precipitation (1234).

In some examples, the operation of the vehicle is selected as a response to the detected accumulation (1240). For example, the vehicle operation may correspond to a steering operation which the control system 300 may implement. As an addition or variation, the vehicle operation may include one in which the speed or acceleration of the vehicle is adjusted.

As an addition or alternative, once the accumulated precipitation is detected, the vehicle may verify or train the model for detecting the accumulated precipitation (1250). In some examples, the vehicle may be instructed to perform a maneuver in which the vehicle is able to alter or reduce the safety hazard to the vehicle when it passes over the particular road segment (1252). By operating at the fringe level, the vehicle may briefly confirm if the accumulated precipitation was detected correctly.

Additionally, as described with other examples, the control system 300 may communicate a semantic label or classification for the detected road condition to the network service 200. In some implementations, the control system 300 communicates the actual presence of the type road condition, as well as the location of the road condition on the road surface. In variations, the control system 300 communicates a traction value for the detected road condition to the network service 200.

Figure 13A:

FIG. 13A through FIG. 13C describe examples of the use of LiDar to detect accumulated precipitation such as ice on a road network. FIG. 13A depicts a human view of the road surface and its surrounding area. FIG. 13B and FIG. 13B illustrate raw data from the LiDar, corresponding to the power and the intensity of the returned reflection signal. The raw intensity and power may be correlated as image data to types of precipitation.

While numerous examples described with FIG. 1 through FIG. 13C provide for a traction determination system or component for use with an autonomous vehicle control system, other examples provide for using examples to provide information to human drivers, to facilitate human drivers in driving on a trip during inclement weather. By way of examples, the traction determination system 100 may be implemented on a human driver vehicle to provide the human driver with notifications and advance information regarding the change in the traction of the road. Still further, in some variations, a human driver may maintain a computing device within their vehicle to receive traction map updates from network service 200. The traction map updates may be communicated to the driver via notifications, graphic visualization of the traction map, and advisory messages.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A method of operating an autonomous vehicle, the method comprising:
    receiving, by a computing system comprising one or more computing devices, sensor data from at least one sensor of the autonomous vehicle;
    determining, by the computing system, a first traction value based on the sensor data from the at least one sensor of the autonomous vehicle, the first traction value being correlative to a coefficient of friction;
    associating, by the computing system, the first traction value with a first location of a first road surface;
    determining, by the computing system, a second traction value of a second location of a second road surface by spatially extrapolating the first traction value of the first location with respect to the second location based on a comparison of respective road characteristics of the first location and the second location, the second location being spaced apart from the first location; and
    storing, by the computing system, the first traction value with the first location and the second traction value with the second location.

2. The method of claim 1, wherein determining the first traction value includes classifying a traction condition at the first location of the first road surface.

3. The method of claim 2, wherein the traction condition corresponds to an accumulated precipitation condition.

4. The method of claim 2, wherein the traction condition corresponds to accumulated snow, rain or ice.

5. The method of claim 1, wherein determining, by the computing system, the first traction value includes remotely determining, by the computing system, the first traction value.

6. The method of claim 5, wherein remotely determining, by the computing system, the first traction value includes using, by the computing system, image data from a light-sensitive device.

7. The method of claim 6, wherein using, by the computing system, image data includes using, by the computing system, a variation in a reflectance of a directed light.

8. The method of claim 6, wherein using, by the computing system, image data includes using, by the computing system, an image of the first road surface to determine a type of accumulated precipitation.

9. The method of claim 1, wherein determining, by the computing system, the first traction value includes measuring, by the computing system, a sensor characteristic that is correlative to the coefficient of friction when the autonomous vehicle is at the first location.

10. The method of claim 1, further comprising transmitting, by the computing system, the first traction value and the first location to a network service.

11. The method of claim 1, wherein determining the first traction value includes receiving, on a network computer, a set of sensor data transmitted from at least the autonomous vehicle, wherein the set of sensor data is correlative to the first traction value.

12. The method of claim 11, wherein associating, by the computing system, the first traction value to the first location includes receiving, by the computing system, the set of sensor data along with location data to identify the first location where the set of sensor data was determined.

13. The method of claim 1, further comprising determining, by the computing system, respective additional traction values of a plurality of additional vehicles by receiving, on a network computer, a set of additional sensor data transmitted from each of the additional vehicles, wherein the set of additional sensor data is (i) correlative to respective additional traction values, and (ii) associated with respective locations of the plurality of additional vehicles.

14. The method of claim 1, further comprising:
    aggregating, by the computing system, the first and the second traction values; and
    storing, b the computing system the aggregated first and second traction values in a geographic data structure that pairs the first location and the second location with the first and the second traction values and at least one additional traction value determined at least in part from additional sensor data transmitted from one or more additional vehicles.

15. The method of claim 1, wherein at least one of determining, by the computing system, the first traction value or determining the second traction value includes applying, by the computing system, a timing function to at least one of the first traction value or the second traction value based on an environmental condition.

16. The method of claim 1, further comprising:
    communicating, by the computing system, with multiple additional vehicles that operate over a geographic region to receive, by the computing system, a set of additional sensor data and a set of additional location data, the set of additional sensor data being generated from one or more sensor components of each of the multiple additional vehicles at respective corresponding locations of the multiple additional vehicles identified by the respective additional location data associated with the respective additional vehicle of the multiple additional vehicles;
    determining, by the computing system, additional traction values from the set of additional sensor data received from each of the multiple additional vehicles; and
    associating by the computing system, the additional traction values determined from each set of additional sensor data with the corresponding location where the respective additional sensor data was generated.

17. The method of claim 1, further comprising:
    on the autonomous vehicle, receiving, by the computing system, a set of additional traction values from a network computer, each additional traction value being associated with a respective additional location within a geographic region; and
    comparing, by the computing system, the first traction value to at least one additional traction value in the set of additional traction values.

18. An autonomous vehicle comprising:
    memory to store instructions; and
    one or more processors to execute the instructions to:
        receive sensor data from at least one sensor of the autonomous vehicle;

determine a first traction value based on the sensor data from the at least one sensor of the autonomous vehicle, the first traction value being correlative to a coefficient of friction;

associate the first traction value with a first location of a first road surface;

determine a second traction value of a second location of a second road surface by spatially extrapolating the first traction value of the first location with respect to the second location based on a comparison of respective road characteristics of the first location and the second location, the second location being spaced apart from the first location; and store the first traction value with the first location and the second traction value with the second location.

19. A non-transitory computer readable medium that stores instructions, which when executed by one or more processors of an autonomous vehicle, cause the autonomous vehicle to perform operations that include:

receiving sensor data from at least one sensor of the autonomous vehicle;

determining a first traction value based on the sensor data from the at least one sensor of the autonomous vehicle, the first traction value being correlative to a coefficient of friction;

associating the first traction value with a first location of a first road surface;

determining a second traction value of a second location of a second road surface by spatially extrapolating the first traction value of the first location with respect to the second location based on a comparison of respective road characteristics of the first location and the second location, the second location being spaced apart from the first location; and storing the first traction value with the first location and the second traction value, with the second location.

* * * * *